(12) United States Patent
Azuma et al.

(10) Patent No.: US 9,264,251 B2
(45) Date of Patent: Feb. 16, 2016

(54) NETWORK SYSTEM, COMMUNICATION METHOD, COMMUNICATION DEVICE, AND COMPUTER-READABLE RECORDING MEDIUM HAVING COMMUNICATION PROGRAM RECORDED THEREON

(75) Inventors: Akihiro Azuma, Osaka (JP); Masaki Takeuchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 170 days.

(21) Appl. No.: 13/502,468

(22) PCT Filed: Oct. 6, 2010

(86) PCT No.: PCT/JP2010/067532
§ 371 (c)(1),
(2), (4) Date: Apr. 17, 2012

(87) PCT Pub. No.: WO2011/048947
PCT Pub. Date: Apr. 28, 2011

(65) Prior Publication Data
US 2012/0209916 A1      Aug. 16, 2012

(30) Foreign Application Priority Data
Oct. 19, 2009   (JP) .................................. 2009-240329

(51) Int. Cl.
*H04L 12/28* (2006.01)
(52) U.S. Cl.
CPC .......... *H04L 12/282* (2013.01); *H04L 12/2809* (2013.01); *H04L 12/2814* (2013.01)
(58) Field of Classification Search
USPC ............. 709/204, 246, 231, 217; 348/552, 14
See application file for complete search history.

(56) References Cited

U.S. PATENT DOCUMENTS

| | | | | |
|---|---|---|---|---|
| 7,877,461 B1 * | 1/2011 | Rimmer | ........................ | 709/217 |
| 7,904,527 B2 * | 3/2011 | Sarma | ........................... | 709/217 |
| 8,056,070 B2 * | 11/2011 | Goller et al. | .................. | 717/168 |
| 8,224,970 B2 * | 7/2012 | Nishiyama | .................... | 709/227 |
| 2004/0249962 A1 * | 12/2004 | Lecomte | ...................... | 709/229 |
| 2005/0102663 A1 | 5/2005 | Fujii | | |
| 2006/0248162 A1 * | 11/2006 | Kawasaki | ..................... | 709/217 |

(Continued)

FOREIGN PATENT DOCUMENTS

| | | |
|---|---|---|
| JP | 2003-102078 A | 4/2003 |
| JP | 2006-24224 A | 1/2006 |

(Continued)

OTHER PUBLICATIONS

International Search Report issued in PCT/JP2010/067532, dated Jan. 11, 2011.

*Primary Examiner* — Brian J Gillis
*Assistant Examiner* — Steve Lin
(74) *Attorney, Agent, or Firm* — Birch, Stewart, Kolasch & Birch, LLP

(57) ABSTRACT

A network system includes a first communication device, a second communication device and a server. The communication device includes a storage unit storing first device information indicating a function of the communication device, and a communication unit for receiving second device information indicating a function of another communication device from the other communication device, transmitting the first and second device information to the server, and receiving first control information used by the first device from the server.

14 Claims, 16 Drawing Sheets

(56) References Cited

U.S. PATENT DOCUMENTS

| | | | |
|---|---|---|---|
| 2007/0124775 A1* | 5/2007 | DaCosta | 725/62 |
| 2007/0192462 A1* | 8/2007 | Bae et al. | 709/223 |
| 2008/0248834 A1* | 10/2008 | Chatterjee et al. | 455/557 |
| 2010/0205628 A1* | 8/2010 | Davis et al. | 725/25 |
| 2010/0317332 A1* | 12/2010 | Bathiche et al. | 455/418 |
| 2011/0138310 A1* | 6/2011 | Gomez et al. | 715/769 |
| 2015/0045019 A1* | 2/2015 | Ojala et al. | 455/426.1 |

FOREIGN PATENT DOCUMENTS

| | | |
|---|---|---|
| JP | 2007-110629 A | 4/2007 |
| JP | 2009-187216 A | 8/2009 |
| JP | 2009-211260 A | 9/2009 |
| WO | WO 02/078385 A1 | 10/2002 |

\* cited by examiner

FIG.3

120A(DEVICE INFORMATION A)

| TERMINAL ID | TERMINAL NAME | FUNCTION INFORMATION |
|---|---|---|
| TV001 | TELEVISION 001 | ・SCREEN(FULL HD)<br>・SCREEN(WVGA) |

FIG.4

220A(DEVICE INFORMATION B)

| TERMINAL ID | TERMINAL NAME | USER ID | FUNCTION INFORMATION |
|---|---|---|---|
| MB001 | MOBILE TERMINAL 001 | USER001 | ・SCREEN (WVGA)+TOUCH PANEL<br>・ELECTRONIC MONEY FUNCTION<br>・FINGERPRINT AUTHENTICATION FUNCTION<br>・MAIL FUNCTION |

FIG.6

| No. | CONTROL INFORMATION | FUNCTION INFORMATION |
|---|---|---|
| 001 | FULL HD MAIN STORY CONTENT | SCREEN (FULL HD) |
| 002 | CONTENT FOR SUBSCREEN | SCREEN (WVGA) |
| 003 | SUBSCREEN OPERATION UI(APPLICATION) | SCREEN (WVGA)+TOUCH PANEL |
| 004 | AIR CONDITIONER CONTROL INFORMATION | AIR CONDITIONER |
| 005 | LIGHTING DEVICE CONTROL INFORMATION | LIGHTING DEVICE |

| No. | TERMINAL ID | TERMINAL NAME | USER ID | FUNCTION INFORMATION | COMMUNICATION IS POSSIBLE OR NOT |
|---|---|---|---|---|---|
| 001 | MB001 | MOBILE TERMINAL 001 | USER001 | ・SCREEN (WVGA)+TOUCH PANEL<br>・ELECTRONIC MONEY FUNCTION<br>・FINGERPRINT AUTHENTICATION FUNCTION<br>・MAIL FUNCTION | POSSIBLE |
| 002 | MB002 | MOBILE TERMINAL 002 | USER002 | ・SCREEN (WVGA)<br>・MAIL FUNCTION | IMPOSSIBLE |
| 003 | MB003 | MOBILE TERMINAL 003 | USER001 | ・SCREEN (WVGA)+TOUCH PANEL<br>・ELECTRONIC MONEY FUNCTION<br>・MAIL FUNCTION | IMPOSSIBLE |

D1(DEVICE INFORMATION A,B)

| No. | FUNCTION INFORMATION |
|---|---|
| 001 | SCREEN (FULL HD) |
| 002 | SCREEN (WVGA) |
| 003 | SCREEN (WVGA)+TOUCH PANEL |
| 004 | ELECTRONIC MONEY FUNCTION |
| 005 | FINGERPRINT AUTHENTICATION FUNCTION |
| 006 | MAIL FUNCTION |

FIG.9

D2(CONTROL INFORMATION A,B)

| No. | CONTROL INFORMATION | FUNCTION INFORMATION |
|---|---|---|
| 001 | FULL HD MAIN STORY CONTENT | SCREEN (FULL HD) |
| 002 | CONTENT FOR SUBSCREEN | SCREEN (WVGA) |
| 003 | SUBSCREEN OPERATION UI(APPLICATION) | SCREEN (WVGA)+TOUCH PANEL |

FIG.10

D3(CONTROL INFORMATION B)

| No. | CONTROL INFORMATION | FUNCTION INFORMATION |
|---|---|---|
| 003 | SUBSCREEN OPERATION UI(APPLICATION) | SCREEN (WVGA)+TOUCH PANEL |

FIG.16

D4(DEVICE INFORMATION A,B)

| No. | DEVICE ID | TERMINAL NAME | FUNCTION INFORMATION | IP ADDRESS |
|---|---|---|---|---|
| 001 | TV001 | TELEVISION 001 | ·SCREEN (FULL HD)<br>·SCREEN (WVGA) | 123456789012 |
| 002 | MB001 | MOBILE TERMINAL 001 | ·SCREEN (WVGA)+TOUCH PANEL<br>·ELECTRONIC MONEY FUNCTION<br>·FINGERPRINT AUTHENTICATION FUNCTION<br>·MAIL FUNCTION | 234567890123 |

FIG.17

D5(CONTROL INFORMATION A)

| DESTINATION | CONTROL INFORMATION |
|---|---|
| TV001 | Web PAGE FOR FULL HD |

FIG.18

D6(CONTROL INFORMATION B)

| DESTINATION | CONTROL INFORMATION |
|---|---|
| MB001 | Web PAGE FOR SUBSCREEN |
| MB001 | PURCHASE APPLICATION FOR MOBILE TERMINAL |

NETWORK SYSTEM, COMMUNICATION METHOD, COMMUNICATION DEVICE, AND COMPUTER-READABLE RECORDING MEDIUM HAVING COMMUNICATION PROGRAM RECORDED THEREON

TECHNICAL FIELD

The present invention relates to a network system including a server and a communication device connectable to the server, a communication method in the network system, the communication device itself, and a computer-readable recording medium on which a program executed in the communication device is recorded. Particularly, the present invention relates to a network system in which control information for controlling a device can be downloaded from a server, a communication method in the network system, the communication device itself, and a computer-readable recording medium on which a program executed in the communication device is recorded.

BACKGROUND ART

Broadband becomes prevalent. With the advancement of mobile broadband, the world of cloud computing is also expanding. Using the cloud computing, a communication device can receive various applications, data, services and the like from a server that can be accessed over the Internet.

For example, a low-cost PC (personal computer) called "netbook" can use these various applications, data and services by means of a browser function. In other words, the netbook can use these various applications, data and services (hereinafter, these will be also referred to as "control information") by means of the browser function, even if applications and data are not stored in the device.

In addition, many digital appliances have a function for connecting to the network installed thereon as a standard function. For example, by using a technique related to DLNA (Digital Living Network Alliance), communication devices in a household are connected to one another via the home network. More specifically, one communication device (such as a liquid crystal television) can output a content (music, a moving image or a still image) and the like stored in an other communication device (such as a PC).

Japanese Patent Laying-Open No. 2006-24224 (PTL 1), for example, discloses an electronic equipment extension system. According to Japanese Patent Laying-Open No. 2006-24224 (PTL 1), a computer includes a connected equipment detection mechanism, and receives an equipment name from a printer serving as a peripheral device, which is in a connected state. When a program (driver) corresponding to this equipment name is not installed, the computer requests installation of the program. When a facsimile unit is further connected to the printer and its function is extended, an equipment name in which the printer and the facsimile unit are combined is acquired and a program corresponding to this equipment name is installed. Thus, when the function of the peripheral device is changed even if the peripheral device is the same, the corresponding program is installed without having special knowledge by a user.

CITATION LIST

Patent Literature

PTL 1: Japanese Patent Laying-Open No. 2006-24224

SUMMARY OF INVENTION

Technical Problem

It is preferable for the user that useful information suited to the connection situation and the like in the home network can be obtained from a service and the like providing a content and the like. More specifically, it is preferable that not only can a television and the like (e.g., liquid crystal television) connectable to the network download a control program (such as a user interface) to be executed in the television itself, but also a mobile terminal (e.g., mobile phone) connectable to the liquid crystal television can obtain a control program (such as a user interface or a cord for remote control) to be executed in the mobile terminal itself.

The present invention has been made to solve the above-mentioned problems, and an object of the present invention is to provide a network system in which the communication device can obtain useful information suited to the connection situation and the like in the home network, a communication method in the network system, the communication device itself, and a computer-readable recording medium on which a program executed in the communication device is recorded.

Solution to Problem

According to an aspect of the present invention, there is provided a network system including first and second devices and a server. The first device includes: a first storage unit storing first device information indicating at least one of a function of the first device and a type of the first device; and a first communication unit for receiving, from the second device, second device information indicating at least one of a function of the second device and a type of the second device, transmitting the first and second device information to the server, and receiving first control information used by the first device from the server. The second device includes: a second storage unit storing the second device information; and a second communication unit for transmitting the second device information to the first device, and receiving second control information used by the second device from the server. The server includes: a server storage unit storing a plurality of functions, each of the plurality of functions being associated with the control information for using the function; a control unit for extracting the first and second control information based on the first and second device information, by referring to the server storage unit; and a server communication unit for transmitting the first control information to the first device, and transmitting the second control information to the second device.

Preferably, the server communication unit transmits the second control information to the second device via the first device.

Preferably, the first communication unit transmits the first and second device information to the server in such a manner that it cannot be determined whether the first device or the second device has each of the functions.

Preferably, the server communication unit transmits the second control information to the second device without passing the second control information through the first device.

Preferably, the first communication unit includes: a first communication interface for receiving the second device information from the second device; and a second communication interface for transmitting the first and second device information to the server, and receiving the first control information from the server.

Preferably, the server communication unit transmits the functions stored in the server storage unit to the first device. The first communication unit transmits, to the server, only a portion of the first device information corresponding to the functions stored in the server storage unit.

Preferably, the server storage unit stores a content in association with the function and the control information. The server communication unit transmits the content to the first device. The control unit extracts the first and second control information based on the first and second device information and the content, by referring to the server storage unit. The first device further includes a display for displaying the content.

Preferably, the first device further includes a display for outputting a content. The server provides the first device with the content to be outputted by the first device.

According to another aspect of the present invention, there is provided a communication method in a network system including first and second devices and a server. The communication method includes the steps of: storing, by the server, a plurality of functions in a storage unit, each of the plurality of functions being associated with control information for using the function; storing, by the first device, first device information indicating at least one of a function of the first device and a type of the first device; storing, by the second device, second device information indicating at least one of a function of the second device and a type of the second device; transmitting, by the second device, the second device information to the first device; transmitting, by the first device, the first and second device information to the server; extracting, by the server, first and second control information used by the first and second devices based on the first and second device information, by referring to the storage unit; transmitting, by the server, the first control information to the first device; and transmitting, by the server, the second control information to the second device.

Preferably, the step of transmitting the second control information includes a step of transmitting the second control information to the second device via the first device.

According to another aspect of the present invention, there is provided a communication device connectable to a server and an other communication device. The communication device includes: a storage unit storing first device information indicating at least one of a function of the communication device and a type of the communication device; and a communication unit for receiving second device information indicating at least one of a function of the other communication device and a type of the other communication device from the other communication device, transmitting the first and second device information to the server, and receiving first control information used by the communication device from the server.

According to another aspect of the present invention, there is provided a communication method in a communication device including a processor, a storage unit and a communication unit. The communication method includes the steps of: storing, by the storage unit, first device information indicating at least one of a function of the communication device and a type of the communication device; receiving, by the processor, second device information indicating at least one of a function of an other communication device and a type of the other communication device from the other communication device via the communication unit; transmitting, by the processor, the first and second device information to a server via the communication unit; and receiving, by the processor, first control information used by the communication device from the server via the communication unit.

According to another aspect of the present invention, there is provided a computer-readable recording medium on which a communication program for causing a communication device including a processor and a communication unit to carry out communication. The communication program causes the processor to execute the steps of: storing first device information indicating at least one of a function of the communication device and a type of the communication device in a storage unit; receiving second device information indicating at least one of a function of an other communication device and a type of the other communication device from the other communication device via the communication unit; transmitting the first and second device information to a server via the communication unit; and receiving first control information used by the communication device from the server via the communication unit.

According to another aspect of the present invention, there is provided a network system including first and second devices and a server. The first device includes: a first storage unit storing first device information indicating at least one of a function of the first device and a type of the first device; and a first communication unit for transmitting the first device information to the second device, receiving second device information indicating at least one of a function of the second device and a type of the second device from the second device, transmitting the first and second device information to the server, and receiving first control information used by the first device from the server. The second device includes: a second storage unit storing the second device information; and a first communication unit for receiving the first device information from the first device, transmitting the second device information to the first device, transmitting the first and second device information to the server, and receiving second control information used by the second device from the server. The server includes: a server storage unit storing a plurality of functions, each of the plurality of functions being associated with the control information for using the function; a control unit for extracting the first and second control information based on the first and second device information, by referring to the server storage unit; and a server communication unit for transmitting the first control information to the first device, and transmitting the second control information to the second device.

Advantageous Effects of Invention

As mentioned above, according to the present invention, the communication device can obtain useful information suited to the connection situation and the like in the home network. For example, the devices existing in the same home network work together in accordance with the configurations thereof to implement an application and a service without putting any special burdens on the user.

BRIEF DESCRIPTION OF DRAWINGS

FIG. 3 is a conceptual diagram showing a data structure of device data (device information A) of the liquid crystal television stored in a storage unit of the liquid crystal television.

FIG. 4 is a conceptual diagram showing a data structure of device data (device information B) of the mobile phone stored in a storage unit of the mobile phone.

FIG. 6 is a conceptual diagram showing a data structure of a function corresponding database of the server stored in a storage unit of the server.

FIG. 7 is a conceptual diagram showing a device information list stored in the storage unit of the liquid crystal television.

FIG. 8 is a conceptual diagram showing transmission data D1 transmitted to the server by the liquid crystal television according to the first embodiment.

FIG. 9 is a conceptual diagram showing transmission data D2 transmitted to the liquid crystal television by the server according to the first embodiment.

FIG. 10 is a conceptual diagram showing transmission data D3 transmitted to the mobile phone by the liquid crystal television.

FIG. 16 is a conceptual diagram showing transmission data D4 transmitted to a server by a liquid crystal television according to the second embodiment.

FIG. 17 is a conceptual diagram showing transmission data D5 transmitted to the liquid crystal television by the server according to the second embodiment.

FIG. 18 is a conceptual diagram showing transmission data D6 transmitted to a mobile phone by the server.

DESCRIPTION OF EMBODIMENTS

Figure 1:
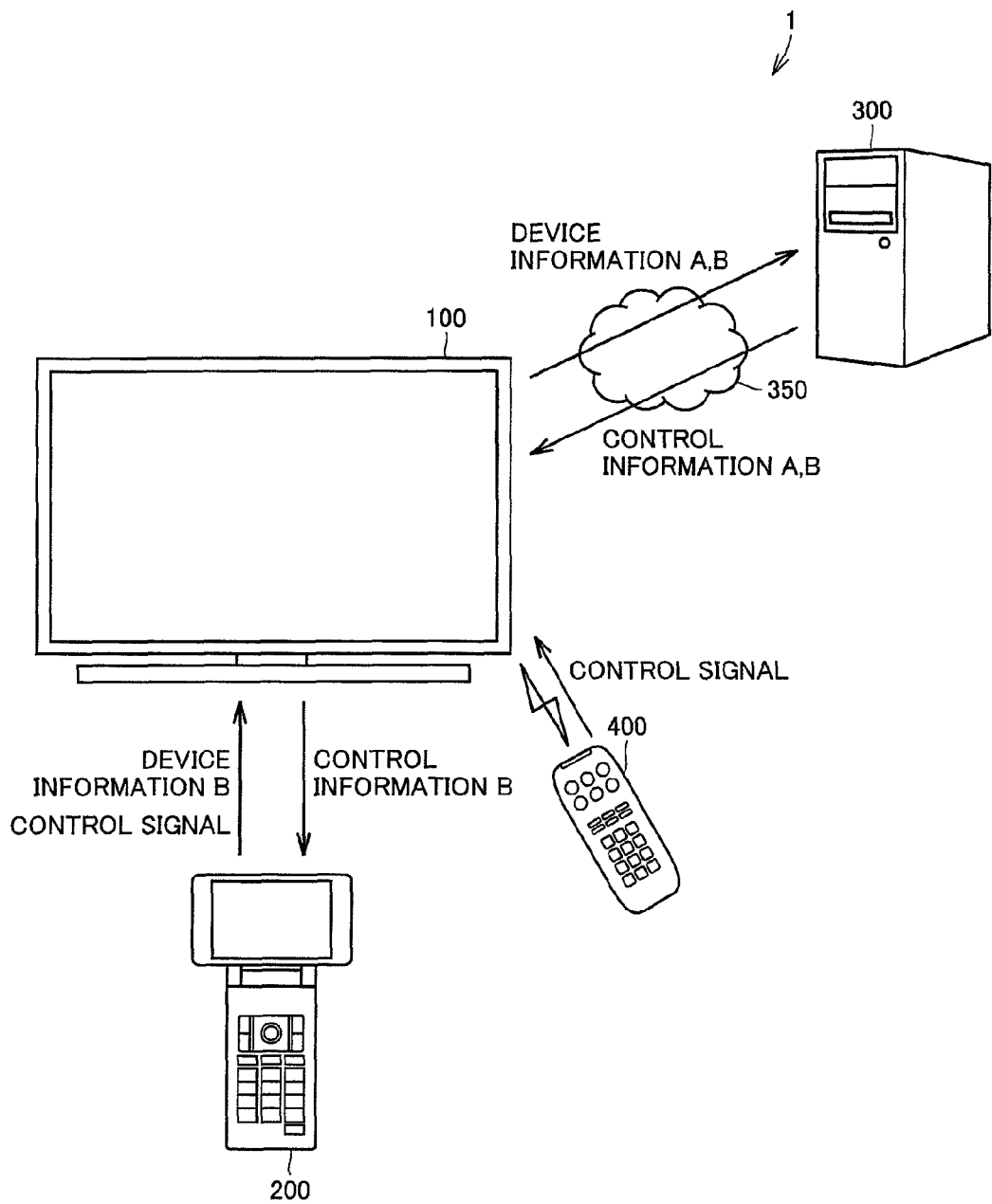
FIG. 1 is a conceptual diagram showing an overall configuration of a network system according to a first embodiment.

Embodiments of the present invention will be described hereinafter with reference to the drawings. In the following description, the same reference characters are allotted to the same components. Their names and functions are also the same. Therefore, detailed description on them will not be repeated.

Control information provided from a server according to the present embodiment is a program executed by a first device, or a program executed by a second device. For example, first control information is a program for implementing a user interface via which the first device accepts a command from a user. For example, second control information is a program for remotely controlling the first device by the second device. It is to be noted that the programs may preexist in the first and second devices, and in this case, the control information may be a pointer specifying a program to be used. The server according to the present embodiment provides not only a content such as a picture and a sound to the first device and the second device but also an application, data and the like corresponding to the content to the first device and the second device as the control information. The server may be formed by a server for providing the content and a server for providing the control information.

More specifically, in first and second embodiments, the first device (a liquid crystal television 100, also simply referred to as "television" in the figures) transmits, to a content providing server 300, a function owned by the first device itself and a function owned by the second device (a mobile phone 200, also referred to as "mobile terminal" in the figures) to which the first device is connectable in the home network. In the first embodiment, server 300 transmits the program for the first device and the program for the second device to liquid crystal television 100. Liquid crystal television 100 transmits (transfers) only the program for the second device to mobile phone 200. It is to be noted that information related to the functions owned by the first and second devices may be information simply specifying a device type. In this case, a database in which the information specifying a device type and the functions owned by the devices are associated with each other may only be stored in the server.

On the other hand, in the second embodiment mentioned below, server 300 transmits the program for the first device to liquid crystal television 100, and transmits the program for the second device to mobile phone 200.

First Embodiment

Overall Configuration of Network System 1

First, an overall configuration of a network system 1 according to the present embodiment will be described with reference to FIG. 1. FIG. 1 is a conceptual diagram showing the overall configuration of network system 1 according to the present embodiment.

Network system 1 according to the present embodiment includes liquid crystal television (first device) 100, a remote controller 400, mobile phone 200 (second device), and server 300. Although the first device corresponds to the liquid crystal television and the second device corresponds to the mobile phone in the present embodiment, the first device is not limited to the liquid crystal television and may be any televisions. Furthermore, any devices may be used as long as the device is connectable to the network. In addition, the second device is not limited to the mobile phone and may be any mobile terminals. Furthermore, the second device is not limited to a portable device. In addition to the above, network system 1 may include an electronic dictionary (third device), an air conditioner (fourth device), a lighting device (fifth device) and the like. Liquid crystal television 100, mobile phone 200, the electronic dictionary, the air conditioner, the lighting device and the like are connected to one another via, for example, the home network. As mentioned above, network system 1 may be a network system including a plurality of connected devices.

Liquid crystal television 100 displays a Web page and the like downloaded from the external server. Liquid crystal television 100 may be another apparatus having a display, such as, for example, a plasma television and organic EL (Electro-Luminescence). Liquid crystal television 100 may also be an apparatus formed by a display apparatus for displaying images and an image data transmission apparatus transmitting data of the images to be displayed on the display apparatus. The image data transmission apparatus includes, for example, an STB (Set Top Box), an HDD recorder, a DVD (Digital Versatile Disc) recorder, a BD (Blu-ray Disc) recorder and the like.

Liquid crystal television 100 is connectable to server 300 via the network such as an Internet 350. Liquid crystal television 100 downloads the Web page from server 300, or downloads a content, which is a product.

Remote controller 400 carries out data communication with liquid crystal television 100. Using, for example, infrared rays, remote controller 400 performs various operations on liquid crystal television 100 such as transmission of a channel switching command or transmission of a product selecting command to liquid crystal television 100, or volume control.

Mobile phone 200 can carry out data communication with a communication carrier network wirelessly (such as WiMAX, PHS, HSDPA, and HSUPA). Mobile phone 200 can carry out data communication with an other device via the network such as, for example, a carrier network and Internet 350. Mobile phone 200 may be an information communication terminal that can be carried by the user, such as a PDA (Personal Digital Assistance), a notebook personal computer, an electronic dictionary, a smartphone, and a netbook.

Data communication is carried out between mobile phone 200 and liquid crystal television 100 in a wireless or wired manner. For example, mobile phone 200 carries out data communication with liquid crystal television 100 using infrared rays, Bluetooth (registered trademark), wireless LAN, or a LAN cable, a USB (Universal Serial Bus) cable, an HDMI (registered trademark) (High-Definition Multimedia Interface) cable and the like. As mentioned above, liquid crystal television 100, remote controller 400 and mobile phone 200 constitute a picture display system.

Server 300 stores a content itself and Web page information for selling the content. In response to a request from liquid crystal television 100, server 300 transmits a Web page of a site where a content (movie data or electronic book data) desired by the user of liquid crystal television 100 is sold to liquid crystal television 100 via the network such as Internet 350. In response to the request from liquid crystal television 100, server 300 transmits the content itself desired by the user of liquid crystal television 100 to liquid crystal television 100 via the network.

It is to be noted that server 300 itself may have a charging function and a settlement function, or an other server (not shown) and the like may have a charging function and a settlement function.

<Overview of Operation of Network System 1>

Particularly, mobile phone 200 according to the present embodiment stores device information B indicating the function owned by mobile phone 200 itself. Mobile phone 200 transmits this device information B to liquid crystal television 100. This function refers to having an application such as, for example, a touch panel-type liquid crystal screen, a fingerprint authentication function and a mail function. In addition, server 300 may include information in which the device type and the function are associated with each other, and thus, device information B may be information by which the device type can be specified.

On the other hand, liquid crystal television 100 also stores device information A indicating the function owned by liquid crystal television 100 itself. When liquid crystal television 100 obtains a content such as moving image data from server 300 or when liquid crystal television 100 replays the content, liquid crystal television 100 transmits device information A and device information B to server 300. It is to be noted that the information related to the functions owned by liquid crystal television 100 and mobile phone 200 may be information simply specifying the types of these devices. In this case, server 300 may only store a database in which the information specifying the device types and the functions owned by the devices are associated with each other.

Server 300 transmits the content itself and control information A corresponding to the content used in liquid crystal television 100 to liquid crystal television 100 via the network such as Internet 350. Control information A is a driver, an application program, HTML data, a UI (user interface) part, contents data and the like executed in liquid crystal television 100. For example, based on control information A, liquid crystal television 100 can implement a user interface corresponding to a content that is being displayed.

In addition, server 300 according to the present embodiment transmits control information B corresponding to a content used in mobile phone 200 to mobile phone 200 via liquid crystal television 100. More specifically, server 300 transmits control information A and B to liquid crystal television 100. Liquid crystal television 100 extracts control information B and transmits this control information B to mobile phone 200. Control information B is, for example, an application program executed in mobile phone 200. It is to be noted that the programs may be prestored in liquid crystal television 100 and mobile phone 200, and in this case, control information A and B may be pointers specifying these programs.

Based on control information B, mobile phone 200 can implement a user interface corresponding to a content that is being displayed. Based on control information B, mobile phone 200 provides a user interface for controlling liquid crystal television 100, the air conditioner and the lighting device. Based on control information B, mobile phone 200 accepts a command related to replay of the content from the user, and transmits a control signal corresponding to the command to liquid crystal television 100.

As mentioned above, in network system 1 according to the present embodiment, the communication devices (liquid crystal television 100 and mobile phone 200) can obtain, from server 300, useful information suited to the connection situation, the type of the content and the like in the home network. In other words, server 300 can provide the useful information suited to the connection situation, the type of the content and the like in the home network to the communication devices (liquid crystal television 100 and mobile phone 200).

A configuration for implementing the above-mentioned functions will be described in detail hereinafter.

<Configuration of Liquid Crystal Television 100>

Figure 2:
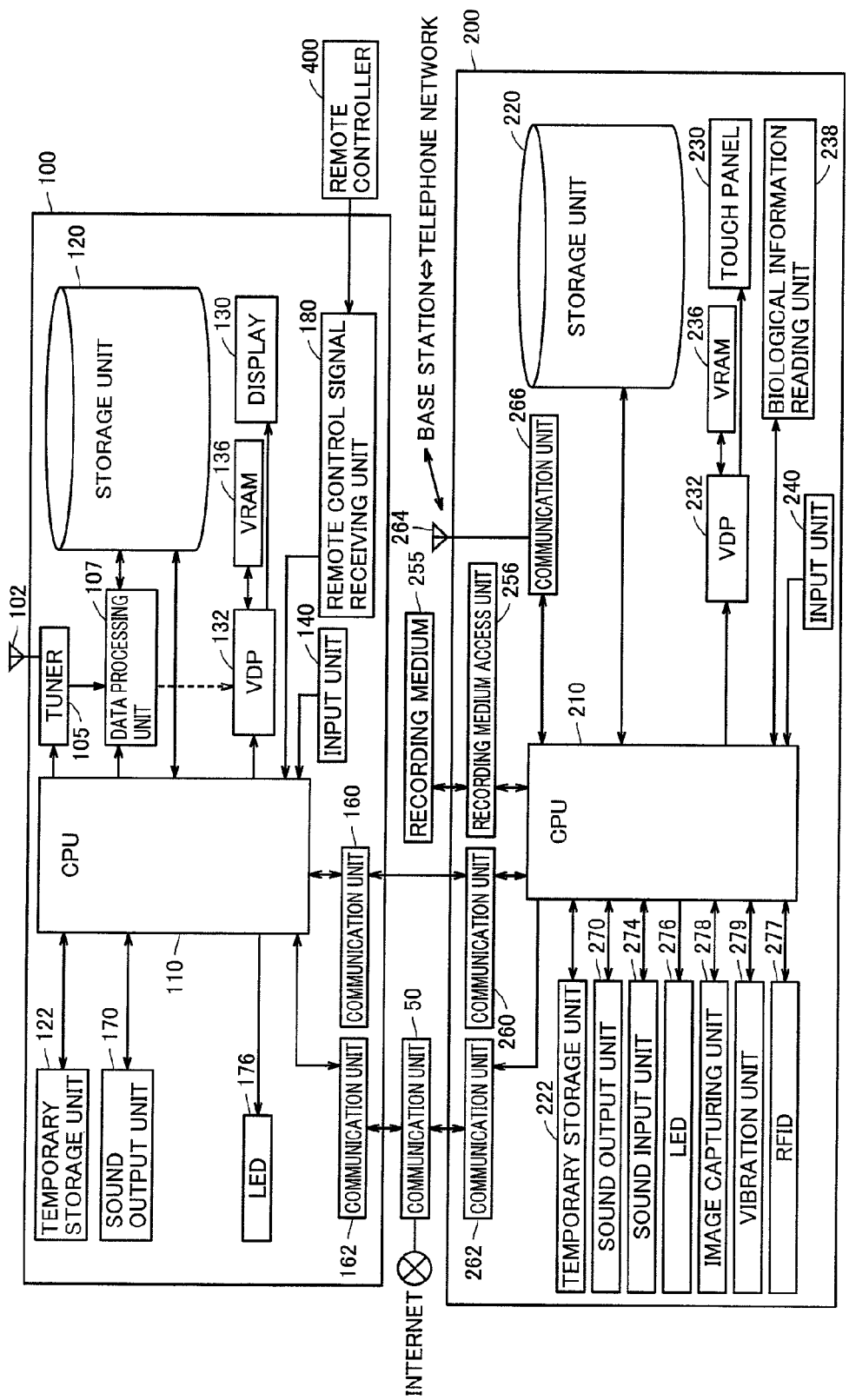
FIG. 2 is a block diagram showing configurations of a liquid crystal television and a mobile phone.

First, one manner of a specific configuration of liquid crystal television 100 constituting network system 1 will be described with reference to FIG. 2. FIG. 2 is a block diagram showing configurations of liquid crystal television 100 and mobile phone 200 according to the present embodiment.

Referring to FIG. 2, liquid crystal television 100 includes a CPU (Central Processing Unit) 110, a temporary storage unit 122 and a storage unit 120.

Storage unit 120 has a function of storing data in a nonvolatile manner. Storage unit 120 is accessed for data by CPU 110. Storage unit 120 according to the present embodiment is a hard disc that can store a large volume of data. Storage unit 120 is not, however, limited to the hard disc, and may be a medium (e.g., flash memory) that can retain data in a nonvolatile manner even if the medium is not supplied with power. Storage unit 120 stores a program, recording data mentioned below, a device ID for identifying liquid crystal television 100, the device information indicating the function owned by liquid crystal television 100, and various other data.

FIG. 3 is a conceptual diagram showing a data structure of device data 120A (device information A) of liquid crystal television 100 stored in storage unit 120 of liquid crystal television 100. As shown in FIG. 3, storage unit 120 stores the ID of liquid crystal television 100, the name of liquid crystal television 100, and the information indicating the function owned by liquid crystal television 100 in association with one another. It is to be noted that liquid crystal television 100 according to the present embodiment has not only a screen for full-screen display but also screens for a PinP (picture-in-picture) function and a PbyP (picture-by-picture) function.

Referring back to FIG. 2, CPU 110 has a function of performing various processes on each unit in liquid crystal television 100, performing operations and the like, in accordance with the program stored in storage unit 120. CPU 110 may be any of a microprocessor, an FPGA (Field Programmable Gate Array), an ASIC (Application Specific Integrated Circuit), a DSP (Digital Signal Processor), and other circuits having an operation function.

Temporary storage unit 122 is accessed for data by CPU 110 and is used as a work memory that temporarily stores data. Temporary storage unit 122 may be any of an RAM (Random Access Memory), an SRAM (Static Random Access Memory), a DRAM (Dynamic Random Access Memory), an SDRAM (Synchronous DRAM), a DDR-SDRAM (Double Data Rate SDRAM), an RDRAM (Rambus Dynamic Random Access Memory (registered trademark)), a Direct-RDRAM (Direct Rambus Dynamic Random Access Memory (registered trademark)), and other circuits having such a configuration that data can be stored and retained in a volatile manner.

Liquid crystal television 100 further includes an antenna 102, a tuner 105 and a data processing unit 107.

Antenna 102 is connected to tuner 105. Tuner 105 receives, via antenna 102, a broadcast signal having a frequency specified by CPU 110. Tuner 105 has a function of receiving the broadcast signal based on digital broadcasting and analog broadcasting.

The broadcast signal includes image data, sound data, text data, and EPG (Electronic ProgramGuide) data. When the broadcast signal is a signal based on digital broadcasting, the broadcast signal further includes BML (Broadcast Markup Language) data and the like. Tuner 105 transmits the received broadcast signal to data processing unit 107.

Data processing unit 107 demodulates the received broadcast signal and generates demodulated data. When the received broadcast signal is a signal based on analog broadcasting, data processing unit 107 performs the following process. First, data processing unit 107 decodes the demodulated data and obtains the image data and the sound data. Data processing unit 107 also obtains the text data and the EPG data from a vertical blanking interval of the broadcast signal.

Upon receiving a display instruction for causing a display 130 to display an image from CPU 110, data processing unit 107 transmits the image data to a VDP (Video Display Processor) 132 mentioned below. Upon receiving the image data, VDP 132 causes display 130 to display an image (moving image or still image) based on the image data.

Upon receiving a recording instruction for a recording process from CPU 110, data processing unit 107 compresses the image data and the sound data, and causes storage unit 120 to store the data as the recording data. The recording data is data compressed in MPEG2 format. The recording data is not, however, limited to the data compressed in MPEG2 format, and may be data compressed in other formats. The other formats herein refer to, for example, MPEG1 format, H.264 format and the like.

When the received broadcast signal is a signal based on digital broadcasting, data processing unit 107 performs the following process. First, data processing unit 107 decodes the demodulated data based on the standard for digital broadcasting, and generates decoded data. The decoded data include the image data, the sound data, the text data, the EPG data, and the BML data. The image data and the sound data included in the decoded data are data compressed in MPEG2 format. The image data and the sound data included in the decoded data are not, however, limited to the data compressed in MPEG2 format, and may be data compressed in other formats. The other formats herein refer to, for example, MPEG1 format, H.264 format and the like.

Upon receiving the display instruction for causing display 130 to display the image data from CPU 110, data processing unit 107 transmits, to below-mentioned VDP 132, the image data included in the decoded data on a channel specified by the display instruction. Upon receiving the image data, VDP 132 causes display 130 to display an image (moving image or still image) based on the image data.

In the following description, the image that is based on the broadcast signal received by tuner 105 and displayed on display 130 is also referred to as "TV image". It is assumed that the number of channel types for TV images that can be directly selected by an operation of depressing numeric buttons of "1" to "12" provided at below-mentioned remote controller 400 for operating liquid crystal television 100 is up to 12. Of course, as the number of the numeric buttons provided at remote controller 400 increases, the number of channel types for TV images that can be directly selected increases.

The remote controller channel numbers "1" to "12" are set to the numeric buttons of "1" to "12" provided at remote controller 400, respectively. For example, the remote controller channel number "3" is set to the numeric button of "3". In addition, one channel for a TV image can be registered with one remote controller channel number. Assume, for example, that the channel number "8" for a TV image is registered with the remote controller channel number "1". In this case, when the user depresses the numeric button of "1" provided at remote controller 400, a remote controller signal for selecting a TV image on the channel number "8" is transmitted from remote controller 400 to liquid crystal television 100.

Liquid crystal television 100 has a function of causing display 130 to display a plurality of types of TV images at the same time. Liquid crystal television 100 also has a function of causing display 130 to display a TV image and other types of images at the same time.

Upon receiving the recording instruction for the recording process from CPU 110, data processing unit 107 causes storage unit 120 to store, as the recording data, the decoded data on the channel specified by the recording instruction. The recording data in this case will be also referred to as "contents" in the following description. In this case, the recording data include the image data, the sound data, the text data, and the BML data.

Liquid crystal television 100 further includes VDP 132 and a VRAM 136.

VRAM 136 has a function of temporarily storing the image data displayed on display 130.

CPU 110 issues a drawing instruction to VDP 132 in accordance with the program stored in storage unit 120. The drawing instruction is an instruction for generating an image and causing display 130 to display the image.

VDP 132 is connected to display 130. In response to the drawing instruction from CPU 110, VDP 132 reads font data, graphic data and the like from the below-mentioned program in storage unit 120, and generates an image using VRAM 136. VDP 132 reads the image data stored in VRAM 136, and causes display 130 to display an image based on this image data.

Liquid crystal television 100 further includes an input unit 140.

Input unit 140 includes a plurality of not-shown buttons. The plurality of buttons are provided on the outside of liquid crystal television 100. When the user depresses any one of the plurality of buttons, input unit 140 transmits a button signal corresponding to the depressed button to CPU 110. CPU 110 performs a predetermined process based on the received button signal.

Liquid crystal television 100 further includes a communication unit (communication interface) 160 and a communication unit (communication interface) 162.

Communication unit 160 receives and transmits data from/to CPU 110. Communication unit 160 also has a function of receiving and transmitting data from/to mobile phone 200 in a wired or wireless manner.

Communication unit 160 has a function of a communication interface for serial transfer based on USB (Universal Serial Bus) 1.1 or USB 2.0 standard. The standard for the communication interface for serial transfer is not, however, limited to USB 1.1 or USB 2.0, and may be other standards.

Furthermore, communication unit 160 may have a function of a communication interface for parallel transfer. The communication interface for parallel transfer is, for example, an interface in accordance with Centronics-compliant standard or IEEE1284 (Institute of Electrical and Electronic Engineers 1284) standard. Communication unit 160 may also have a function of a communication interface based on IEEE1394 or SCSI standard.

Communication unit 160 further has a wireless data communication function. The wireless data communication function has a function of carrying out data communication wirelessly using Bluetooth (registered trademark). The wireless data communication is not, however, limited to the method using Bluetooth (registered trademark), and may be carried out using other wireless techniques such as, for example, other communication methods using infrared rays and the like, and a wireless technique based on any of IEEE802.11a, IEEE802.11b and IEEE802.11g, which are the standards for wireless LAN. Communication unit 160 carries out data communication with mobile phone 200 wirelessly in response to a control instruction from CPU 110. It is to be noted that communication unit 162 mentioned below may carry out data communication between liquid crystal television 100 and mobile phone 200.

Communication unit 162 receives and transmits data from/to CPU 110. Communication unit 162 has a function of carrying out data communication using the wireless technique based on any of IEEE802.11a, IEEE802.11b and IEEE802.11g, which are the standards for wireless LAN. The wireless technique is not, however, limited to the technique based on any of IEEE802.11a, IEEE802.11b and IEEE802.11g, and may be other wireless techniques. Therefore, communication unit 162 can carry out data communication with a communication unit 50 wirelessly.

Communication unit 162 further has a function of a communication interface using Ethernet (registered trademark). Therefore, communication unit 162 can carry out data communication with communication unit 50 via, for example, the LAN cable.

Therefore, liquid crystal television 100 in the present embodiment can also download a program from the network such as Internet 350 via communication unit 50 and communication unit 162, and cause storage unit 120 to store the program. In this case, the downloaded program is a program.

CPU 110 performs a predetermined process in accordance with the program (program) downloaded from the network such as Internet 350. A program for downloading is prestored in storage unit 120. CPU 110 downloads a new program based on the program for downloading.

Liquid crystal television 100 further includes a remote controller signal receiving unit (remote control signal receiving unit) 180. Remote controller signal receiving unit 180 has a function of receiving the remote controller signal for operating liquid crystal television 100, which is outputted from remote controller 400. Remote controller signal receiving unit 180 transmits the received remote controller signal to CPU 110. CPU 110 performs a corresponding process in response to the received remote controller signal. As mentioned above, the numeric buttons of "1" to "12" for selecting a TV image are provided at remote controller 400.

It is to be noted that above-mentioned mobile phone 200 may have the above-mentioned function of remote controller 400.

CPU 110 carries out data communication with a sound output unit 170. When CPU 110 transmits the sound data to sound output unit 170, sound output unit 170 outputs, from a speaker, a sound based on the sound data received from CPU 110. CPU 110 carries out data communication with an LED 176. LED 176 emits light based on a control instruction from CPU 110.

<Communication Unit 50>

Referring to FIG. 2, in the present embodiment, communication unit 50 is arranged within a house in which liquid crystal television 100 is arranged. Communication unit 50 has a function of simultaneously carrying out data communication with a plurality of devices arranged nearby, using the wireless technique based on any of IEEE802.11a, IEEE802.11b and IEEE802.11g, which are the standards for wireless LAN. Communication unit 50 according to the present embodiment can carry out data communication wirelessly with mobile phone 200, liquid crystal television 100, an other network and the like.

Communication unit 50 further has a communication interface using Ethernet (registered trademark), and has a router function including an NAT (Network Address Translation) function of converting an address of the device into an address in an other network when an apparatus in the picture display system issues a request to connect to the other network. Therefore, communication unit 50 can carry out data communication with each of liquid crystal television 100, mobile phone 200 and the other network via, for example, the LAN cable. In other words, communication unit 50 can carry out data communication in a wired manner with each of liquid crystal television 100, mobile phone 200 and the other network.

<Configuration of Mobile Phone 200>

Next, one manner of a specific configuration of mobile phone 200 constituting network system 1 will be described with reference to FIG. 2. For the sake of description, FIG. 2 also shows a recording medium 255. A program described below is recorded on recording medium 255. In other words, the program is recorded on the medium and the like and distributed as a program product. Recording medium 255 itself is also distributed as a program product.

Mobile phone 200 includes a CPU 210, a temporary storage unit 222 and a storage unit 220.

Storage unit 220 has a function of storing data in a nonvolatile manner. Storage unit 220 is accessed for data by CPU 210. Storage unit 220 is a medium (e.g., flash memory) that can retain data in a nonvolatile manner even if the medium is not supplied with power. Storage unit 220 stores a program, recording data mentioned below, a device ID for identifying mobile phone 200, the device information indicating the function owned by mobile phone 200, and various other data. The program includes a remote controller program mentioned below.

FIG. 4 is a conceptual diagram showing a data structure of device data 220A (device information B) of mobile phone 200 stored in storage unit 220 of mobile phone 200. As shown in FIG. 4, storage unit 220 stores the ID of mobile phone 200, the name of mobile phone 200, and the information indicating the function owned by mobile phone 200 in association with one another.

Referring back to FIG. 2, CPU 210 has a function of performing various processes on each unit in mobile phone 200, performing operations and the like, in accordance with the program stored in storage unit 220. CPU 210 may be any of a microprocessor, an FPGA (Field Programmable Gate Array), an ASIC (Application Specific Integrated Circuit), a DSP (Digital Signal Processor), and other circuits having an operation function. As shown in FIG. 4, CPU 210 may also include information (such as a user ID) for identifying the user.

Temporary storage unit 222 is accessed for data by CPU 210 and is used as a work memory that temporarily stores data. Temporary storage unit 222 may be any of an RAM (Random Access Memory), an SRAM (Static Random Access Memory), a DRAM (Dynamic Random Access Memory), an SDRAM (Synchronous DRAM), a DDR-SDRAM (Double Data Rate SDRAM), an RDRAM (Rambus Dynamic Random Access Memory (registered trademark)), a Direct-RDRAM (Direct Rambus Dynamic Random Access Memory (registered trademark)), and other circuits having such a configuration that data can be stored and retained in a volatile manner.

Mobile phone 200 further includes a VDP 232, a VRAM (Video Random Access Memory) 236 and a biological information reading unit 238.

VRAM 236 has a function of temporarily storing image data displayed on a touch panel 230.

CPU 210 issues a drawing instruction to VDP 232 in accordance with the program stored in storage unit 220. The drawing instruction is an instruction for generating an image and causing touch panel 230 to display the image.

VDP 232 is connected to touch panel 230. In response to the drawing instruction from CPU 210, VDP 232 reads font data, graphic data and the like from the below-mentioned program in storage unit 220, and generates an image using VRAM 236. VDP 232 reads the image data stored in VRAM 236, and causes touch panel 230 to display an image based on this image data.

Touch panel 230 according to the present embodiment reads the information for identifying the user.

Mobile phone 200 further includes an input unit 240 and a recording medium access unit 256.

CPU 210 receives, from input unit 240, a button signal corresponding to a button depressed in a short time or depressed in a long time, of a plurality of buttons included in input unit 240. CPU 210 performs a process corresponding to the received button signal.

When recording medium 255 is inserted into (mounted on) mobile phone 200 from the above-mentioned recording medium insertion unit, recording medium access unit 256 can access recording medium 255 for data. As a result, recording medium access unit 256 can read the program from recording medium 255.

The program stored in recording medium 255 is read by recording medium access unit 256 in accordance with an installation process of CPU 210, and CPU 210 causes storage unit 220 to store the program. This program for the installation process is prestored in storage unit 220, and CPU 210 performs the installation process based on the program for the installation process.

It is not always necessary to install the program on storage unit 220. In this case, CPU 210 reads the program stored in recording medium 255 via recording medium access unit 256, and performs a predetermined process based on the program. Furthermore, contents data and the like are also recorded on recording medium 255. The contents data are, for example, music data, moving image data and the like.

Recording medium 255 may be any of a floppy (registered trademark) disc, a CF (Compact Flash (registered trademark)) card, an SM (Smart Media (registered trademark)), an MMC (Multi Media Card (registered trademark)), an SD (Secure Digital (registered trademark)) memory card, a memory stick (registered trademark), an xD picture card (registered trademark), and nonvolatile memories other than the above. Recording medium 255 may also be a magnetic memory such as a hard disc.

Mobile phone 200 further includes a communication unit (communication interface) 260 and a communication unit (communication interface) 262.

Communication unit 260 receives and transmits data from/to CPU 210. Communication unit 260 also has a function of receiving and transmitting data from/to liquid crystal television 100 in a wired or wireless manner.

Communication unit 260 has a function of a communication interface for serial transfer based on USB (Universal Serial Bus) 1.1 or USB 2.0 standard. The standard for the communication interface for serial transfer is not, however, limited to USB 1.1 or USB 2.0, and may be other standards.

Furthermore, communication unit 260 may have a function of a communication interface for parallel transfer. The communication interface for parallel transfer is, for example, an interface in accordance with Centronics-compliant standard or IEEE1284 (Institute of Electrical and Electronic Engineers 1284) standard. Communication unit 260 may also have a function of a communication interface based on IEEE1394 or SCSI standard.

Communication unit 260 further has a wireless data communication function. The wireless data communication function has a function of carrying out data communication wirelessly using Bluetooth (registered trademark). The wireless data communication is not, however, limited to the method using Bluetooth (registered trademark), and may be carried out using, for example, other communication methods using infrared rays and the like, and a wireless technique based on any of IEEE802.11a, IEEE802.11b and IEEE802.11g, which are the standards for wireless LAN. Communication unit 260 carries out data communication with liquid crystal television 100 wirelessly in response to a control instruction from CPU 210.

Communication unit 262 receives and transmits data from/to CPU 210. Communication unit 262 has a function of carrying out data communication using the wireless technique based on any of IEEE802.11a, IEEE802.11b and IEEE802.11g, which are the standards for wireless LAN. The wireless technique is not, however, limited to the technique based on any of IEEE802.11a, IEEE802.11b and IEEE802.11g, and may be other wireless techniques. Therefore, communication unit 262 can carry out data communication with communication unit 50 wirelessly.

Communication unit 262 further has a function of a communication interface using Ethernet (registered trademark). Therefore, communication unit 262 can carry out data communication with communication unit 50 via, for example, the LAN cable.

Therefore, mobile phone 200 in the present embodiment can also download a program through the network and the like via communication unit 50 and communication unit 262, and cause storage unit 220 to store the program. In this case, the downloaded program is a program.

CPU 210 performs a predetermined process in accordance with the program (program) downloaded via the network and the like. A program for downloading is prestored in storage unit 220, and CPU 210 performs the download process based on the program for downloading. It is to be noted that a communication unit 266 mentioned below may download the program and the like.

Mobile phone 200 further includes an antenna 264 and communication unit 266.

Antenna 264 is connected to communication unit 266. In other words, both implements a communication interface. Communication unit 266 has a function of receiving and transmitting a wireless communication signal using antenna 264. Communication unit 266 receives, via antenna 264, a wireless communication signal having a frequency specified by CPU 210. The wireless communication signal is a signal including sound data, character data, image data and the like.

Using antenna 264, communication unit 266 carries out communication with a not-shown nearest base station in accordance with the wireless communication signal. The nearest base station can carry out communication with a telephone network. Therefore, using antenna 264, communication unit 266 carries out communication with the telephone network via the nearest base station in accordance with the wireless communication signal. Upon receiving the wireless communication signal, communication unit 266 demodulates this wireless communication signal and transmits data based on the demodulated wireless communication signal to CPU 210. When communication unit 266 transmits the wireless communication signal, communication unit 266 receives data (e.g., sound data) from CPU 210 and converts the data into a wireless communication signal based on a predetermined protocol. Then, using antenna 264, communication unit 266 transmits the converted wireless communication signal to the telephone network via the not-shown nearest base station.

By communication with the nearest base station, communication unit 266 can also obtain information indicating a position of the base station (hereinafter, also referred to as "base station position information"). Communication unit 266 transmits the obtained base station position information to CPU 210 in response to a control instruction from CPU 210. CPU 210 can roughly grasp a position of mobile phone 200 based on the received base station position information.

Communication unit 266 also has a GPS (Global Positioning System) function. The GPS function is a function of obtaining information of the position (position based on latitude, longitude, altitude and the like) of mobile phone 200 (hereinafter, also referred to as "GPS position information") by communication with a satellite. Communication unit 266 obtains the GPS position information and transmits the GPS position information to CPU 210 in response to a control instruction from CPU 210.

CPU 210 carries out data communication with a sound output unit 270 and a sound input unit 274.

When CPU 210 transmits the sound data to sound output unit 270, sound output unit 270 outputs, from a speaker, a sound based on the sound data received from CPU 210.

When the user emits a sound to a microphone included in sound input unit 274, sound input unit 274 converts the sound obtained by the microphone into sound data and transmits the sound data to CPU 210.

CPU 210 carries out data communication with an LED 276 and an image capturing unit 278. LED 276 emits light based on a control instruction from CPU 210.

Image capturing unit 278 performs the above-mentioned image capturing process and transmits captured image data to CPU 210 based on a control instruction from CPU 210. Upon receiving the captured image data, CPU 210 causes any one of temporary storage unit 222, storage unit 220 and recording medium 255 to store the captured image data.

Mobile phone 200 further includes a vibration unit 279. Vibration unit 279 has a function of vibrating mobile phone 200 based on a control instruction from CPU 210. When an incoming telephone call is received and when an e-mail is received, for example, vibration unit 279 vibrates mobile phone 200 based on the control instruction from CPU 210.

Mobile phone 200 further includes an RFID 277. RFID 277 is an integrated circuit based on, for example, RFID (Radio Frequency Identification) such as FeliCa (registered trademark), and carries out communication with a not-shown reading terminal in a noncontact manner. RFID 277 also outputs data such as the device ID based on a control instruction from CPU 210.

<Configuration of Server 300>

Figure 5:
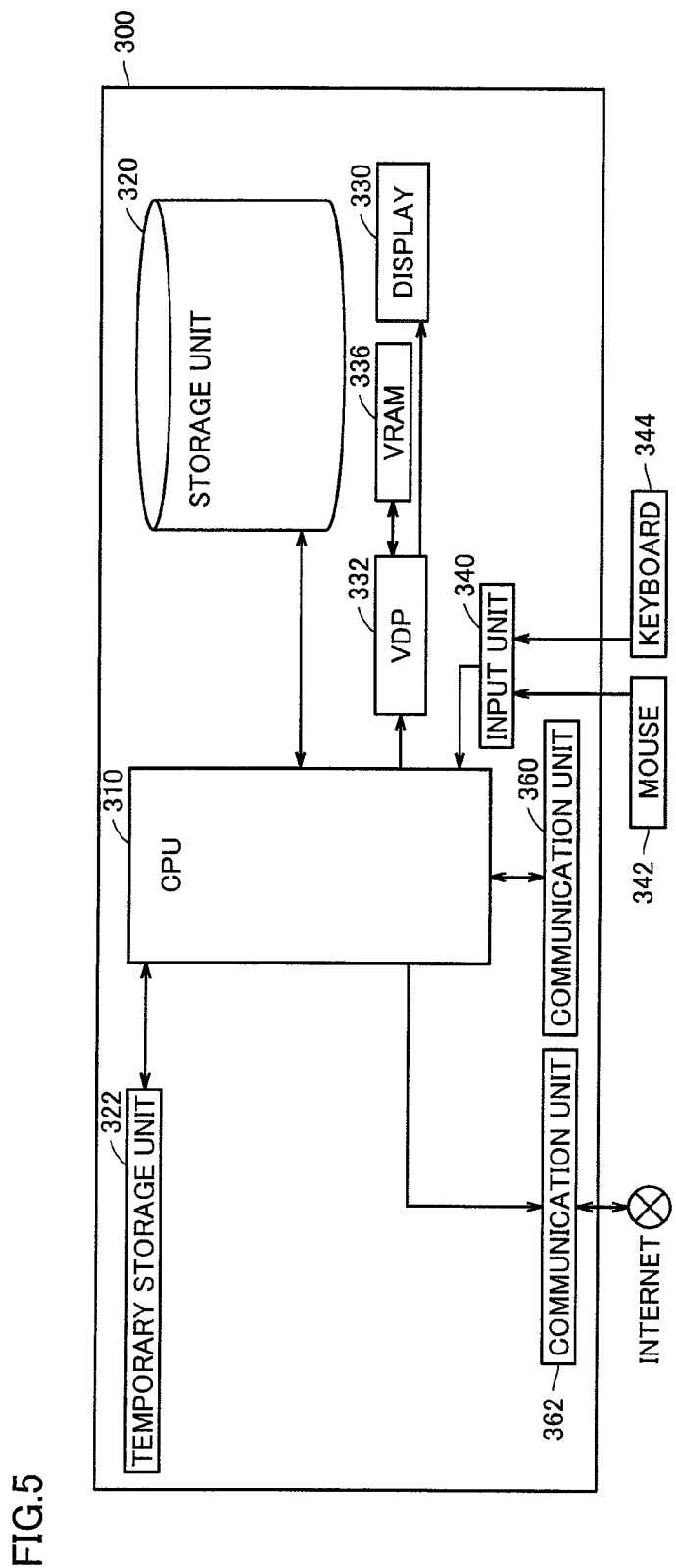
FIG. 5 is a block diagram showing a configuration of a server.

Next, one manner of a specific configuration of server 300 constituting network system 1 will be described with reference to FIG. 5. FIG. 5 is a block diagram showing the configuration of server 300.

Server 300 includes a display 330, a CPU 310, a temporary storage unit 322, and a storage unit 320.

Display 330 has a function of displaying a character, an image and the like. Display 330 is similar to above-mentioned display 130, and thus, detailed description will not be repeated.

Storage unit 320 has a function of storing data in a nonvolatile manner. Storage unit 320 is accessed for data by CPU 310. Storage unit 320 is a hard disc that can store a large volume of data. Storage unit 320 is not, however, limited to the hard disc, and may be a medium (e.g., flash memory) that can retain data in a nonvolatile manner even if the medium is not supplied with power. Storage unit 320 stores various programs, various contents data, a function corresponding database 320A, a user registration database, a charging-related database and the like.

The user registration database stores user registration information for each user (liquid crystal television 100 or mobile phone 200) who desires registration to a service provided by server 300 itself. In other words, storage unit 320 stores the user registration database for each service. The user registration database stores identification information and other information for each registered user. The user registration database according to the present embodiment stores, for each registered user, a registration number indicating the order of registration, user identification information for identifying the user, a password, a television ID for identifying liquid crystal television 100 of the user, a device ID for identifying mobile phone 200 of the user, a name of the user, the name of the user indicated by hiragana, a mail address of the user or a mail address of mobile phone 200 of the user, an address of the user and the like.

FIG. 6 is a conceptual diagram showing a data structure of function corresponding database 320A of server 300 stored in storage unit 320 of server 300. As shown in FIG. 6, storage unit 320 stores, for each control information to be provided, identification information, control information and corresponding function information in association with one another. As a result, by referring to function corresponding database 320A, CPU 310 can extract the control information corresponding to the functions owned by liquid crystal television 100 and mobile phone 200. In other words, CPU 310 extracts the control information corresponding to the functions included in device information A and B. It is to be noted that the function information may be information for specifying the device type, not the function itself.

Referring back to FIG. 5, CPU 310 has a function of performing various processes on each unit in server 300, performing operations and the like, in accordance with the program stored in storage unit 320. CPU 310 is similar to above-mentioned CPU 210, and thus, detailed description will not be repeated.

Temporary storage unit 322 is accessed for data by CPU 310 and is used as a work memory that temporarily stores data. Temporary storage unit 322 is similar to above-mentioned temporary storage unit 222, and thus, detailed description will not be repeated.

Server 300 further includes a VDP 332 and a VRAM 336.

VRAM 336 has a function of temporarily storing the image data displayed on display 330.

CPU 310 issues a drawing instruction to VDP 332 in accordance with the program stored in storage unit 320. The drawing instruction is an instruction for generating an image and causing display 330 to display the image.

VDP 332 is connected to display 330. In response to the drawing instruction from CPU 310, VDP 332 reads font data, graphic data and the like from the below-mentioned program in storage unit 320, and generates an image using VRAM 336. VDP 332 reads the image data stored in VRAM 336, and causes display 330 to display an image based on this image data.

Server 300 further includes an input unit 340.

A mouse 342 and a keyboard 344 are connected to input unit 340. The user (such as an administrator of the service) provides an instruction to server 300 using mouse 342 or keyboard 344. The instruction inputted from mouse 342 or keyboard 344 is transmitted to CPU 310 via input unit 340. CPU 310 performs a predetermined process based on the instruction inputted from input unit 340.

Server 300 further includes a communication unit (communication interface) 360 and a communication unit (communication interface) 362.

Communication unit 360 receives and transmits data from/to CPU 310. Communication unit 360 also has a function of receiving and transmitting data from/to a not-shown other apparatus in a wired or wireless manner. Communication unit 360 has a configuration and a function similar to those of above-mentioned communication unit 260, and thus, detailed description will not be repeated.

Communication unit 362 receives and transmits data from/to CPU 310. Communication unit 362 can carry out data communication wirelessly with the network such as Internet 350. In other words, communication unit 362 can carry out data communication with liquid crystal television 100 and mobile phone 200 via the network. Communication unit 362 can also carry out data communication with the network via, for example, the LAN cable.

<Reception and Transmission of Data>

Next, an operation of receiving and transmitting data in network system 1 will be described. First, referring to FIGS. 1 and 4, CPU 210 of mobile phone 200 connectable to liquid crystal television 100 transmits device data 220A to liquid crystal television 100 via communication unit 260 in response to a request from liquid crystal television 100. CPU 110 of liquid crystal television 100 receives device data 220A from mobile phone 200 via communication unit 160. CPU 110 of liquid crystal television 100 also receives device data from other connectable devices via communication unit 160.

FIG. 7 is a conceptual diagram showing a device information list 120B stored in storage unit 120 of liquid crystal television 100. Referring to FIG. 7, CPU 110 of liquid crystal television 100 causes storage unit 120 to store, as device information list 120B, device data 220A received from the connectable device. More specifically, CPU 110 stores the device ID, the terminal name, the user ID, the function information, and whether communication is possible or not, which have been received via communication unit 160, in association with one another for each connectable device.

CPU 110 according to the present embodiment determines, at predetermined timing, whether communication with each mobile phone 200 is possible or not. Based on a result of the determination, CPU 110 updates the section "communication is possible or not" in the device information list. At this time, CPU 110 may update the function information and the like.

FIG. 8 is a conceptual diagram showing transmission data (device configuration information) D1 transmitted to server 300 by liquid crystal television 100 according to the present embodiment. Referring to FIG. 8, based on device information list 120B, CPU 110 of liquid crystal television 100 collectively transmits the function owned by liquid crystal television 100 and the functions owned by the devices that can carry out communication with liquid crystal television 100, to server 300 via communication unit 162. More specifically, in the present embodiment, based on device information list 120B, CPU 110 of liquid crystal television 100 updates transmission data D1 as needed, which is a collection of the function owned by liquid crystal television 100 and the functions owned by the devices that can carry out communication with liquid crystal television 100.

In the present embodiment, server 300 cannot recognize which device has which function, based on transmission data D1. In other words, transmission data D1 does not include a correspondence relationship between the function and the device, and thus, server 300 cannot recognize which device has which function and which device is connected to liquid crystal television 100. This aims at preventing the server (service provider) from knowing in detail which user connects which device. Depending on an embodiment, however, information (transmission data) by which a detailed device configuration is known may be transmitted, or only information by which the device type and the device configuration can be identified may be transmitted.

FIG. 9 is a conceptual diagram showing transmission data D2 transmitted to liquid crystal television 100 by server 300 according to the present embodiment. By referring to function corresponding database 320A, CPU 310 of server 300 extracts a function included in function corresponding database 320A and control information corresponding to the function, of the functions included in transmission data D1. In other words, CPU 310 of server 300 extracts the function included in transmission data D1 and the control information corresponding to the function, of the functions included in function corresponding database 320A. CPU 310 of server 300 transmits this control information and this function to liquid crystal television 100 in association with each other as transmission data D2 via communication unit 362.

CPU 110 of liquid crystal television 100 receives transmission data D2 from server 300. Based on control information A included in transmission data D2, liquid crystal television 100 can execute an application and the like related to a content that is being displayed on liquid crystal television 100.

FIG. 10 is a conceptual diagram showing transmission data D3 transmitted to mobile phone 200 by liquid crystal television 100. Referring to FIG. 10, based on transmission data D2 from server 300, CPU 110 of liquid crystal television 100 extracts control information corresponding to the function owned by mobile phone 200, by referring to device information list 120B. CPU 110 of liquid crystal television 100 transmits transmission data D3 including control information B corresponding to the function owned by mobile phone 200 to mobile phone 200 using communication unit 160.

In other words, by referring to device information list 120B, CPU 110 of liquid crystal television 100 creates transmission data D3 for each communication device connected to liquid crystal television 100. CPU 110 extracts, from transmission data D2, control information corresponding to a function of each communication device in device information list 120B, and transmits a combination of the function of each communication device and the control information to the communication device as transmission data.

Mobile phone 200 receives, from liquid crystal television 100, transmission data D3 that can be used by mobile phone 200 itself. Based on control information B included in transmission data D3, mobile phone 200 implements a user interface and the like for remotely controlling liquid crystal television 100, the air conditioner and the lighting device.

<Device Registration Process>

Figure 11:
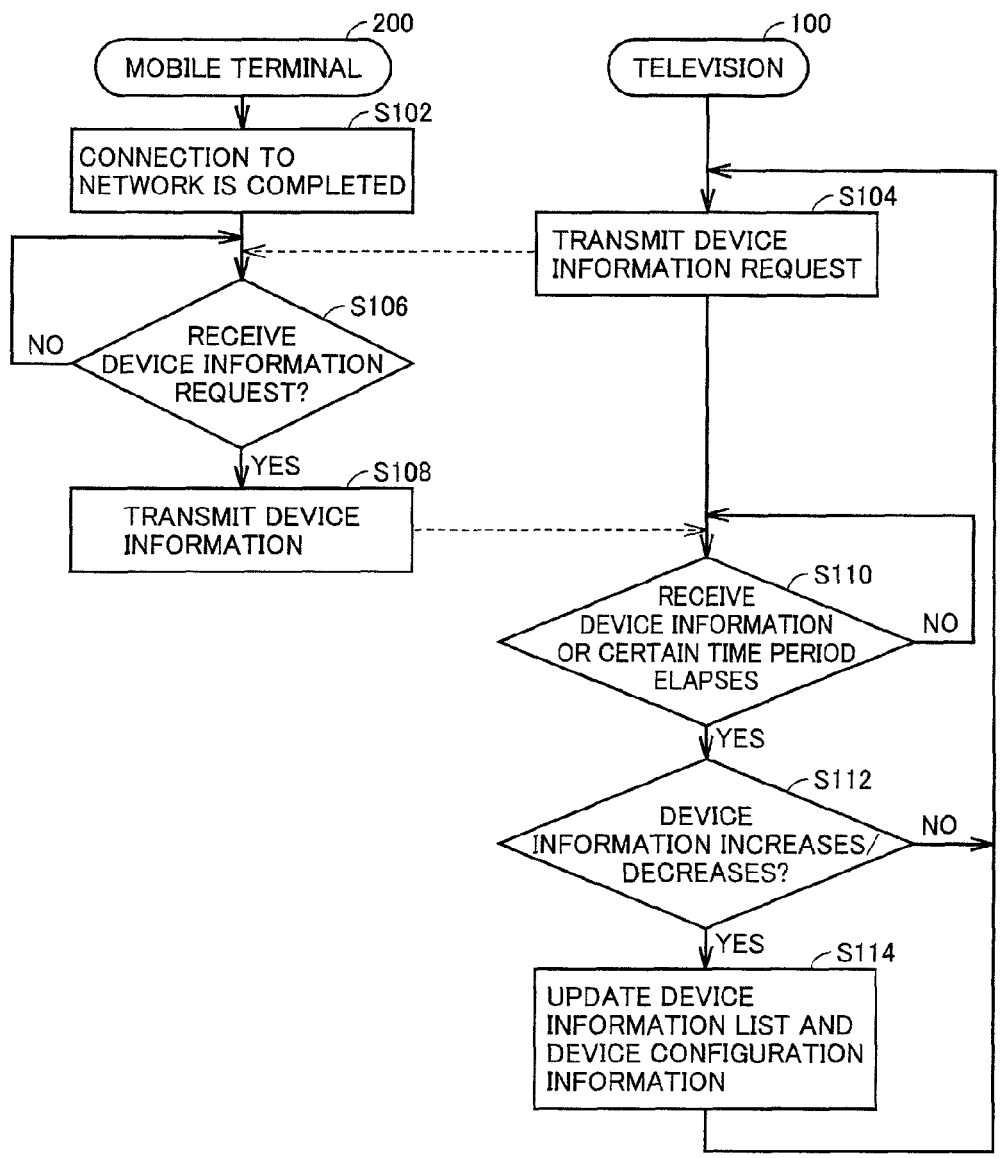
FIG. 11 is a sequence diagram showing a process procedure of a device registration process in the network system according to the first embodiment.

Next, a process procedure of a device registration process in network system 1 according to the present embodiment will be described with reference to FIGS. 2 and 11. FIG. 11 is a sequence diagram showing the process procedure of the device registration process in network system 1 according to the present embodiment.

CPU 210 of mobile phone 200 connects, via communication unit 260 or communication unit 262, to the home network formed by liquid crystal television 100, mobile phone 200 and the like (step S102). When mobile phone 200 is connected, liquid crystal television 100 requests the device information from mobile phone 200 via communication unit 160 or communication unit 162 (step S104). Liquid crystal television 100 may request the device information from mobile phone 200 at every predetermined time period, or may request the device information from mobile phone 200 every time a request is received from the service (server 300). In the present embodiment, liquid crystal television 100 obtains the device information from mobile phone 200 regardless of the request from the service.

CPU 210 of mobile phone 200 determines whether or not CPU 210 of mobile phone 200 has accepted the request from liquid crystal television 100 via communication unit 260 or communication unit 262 (step S106). If CPU 210 of mobile phone 200 does not accept the request from liquid crystal television 100 (NO in step S106), the process from step S106 is repeated. If CPU 210 of mobile phone 200 has accepted the request from liquid crystal television 100 (YES in step S106), CPU 210 of mobile phone 200 transmits device information B (device data 220B) of mobile phone 200 itself to liquid crystal television 100 via communication unit 260 or communication unit 262 (step S108).

CPU 110 of liquid crystal television 100 determines whether or not CPU 110 of liquid crystal television 100 has received device information B from mobile phone 200 via communication unit 160 or communication unit 162 (step S110). Alternatively, CPU 110 of liquid crystal television 100 determines whether or not a predetermined time period has elapsed since liquid crystal television 100 requested the device information. If CPU 110 of liquid crystal television 100 does not receive device information B and if the predetermined time period does not elapse (NO in step S110), CPU 110 repeats the process from step S110.

On the other hand, if CPU 110 of liquid crystal television 100 has received device information B or if the predetermined time period has elapsed (YES in step S110), CPU 110 determines whether or not the device information has increased/decreased (step S112). If the device information has increased/decreased (YES in step S112), CPU 110 updates device information list 120B and transmission data (device configuration information) D1 (step S114). Then, CPU 110 repeats the process from step S104.

If the device information does not increase/decrease (NO in step S112), CPU 110 repeats the process from step S104. Although liquid crystal television 100 transmits the device information request in the present embodiment, mobile phone 200 may transmit connection to liquid crystal television 200 and the device information when mobile phone 200 is connected to the network. In addition, although not shown in FIG. 11, it is desirable that after mobile phone 200 is connected to the network, liquid crystal television 100 constantly monitors the connection of mobile phone 200, and can update device information list 120E and the device configuration information when mobile phone 200 is disconnected.

<Control Information Reception/Transmission Process>

Figure 12:
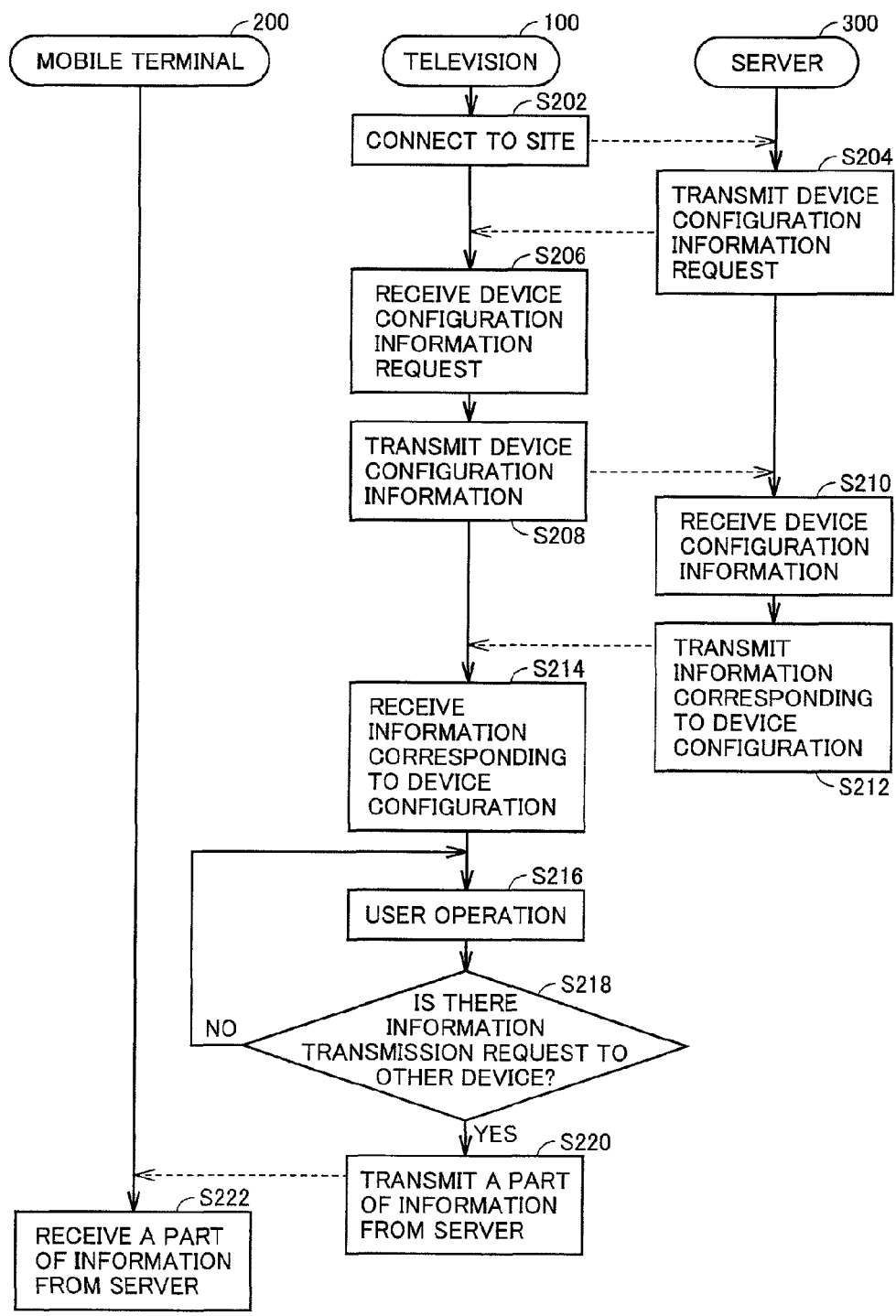
FIG. 12 is a sequence diagram showing a process procedure of a control information reception/transmission process in network system 1 according to the first embodiment.
Figure 13:
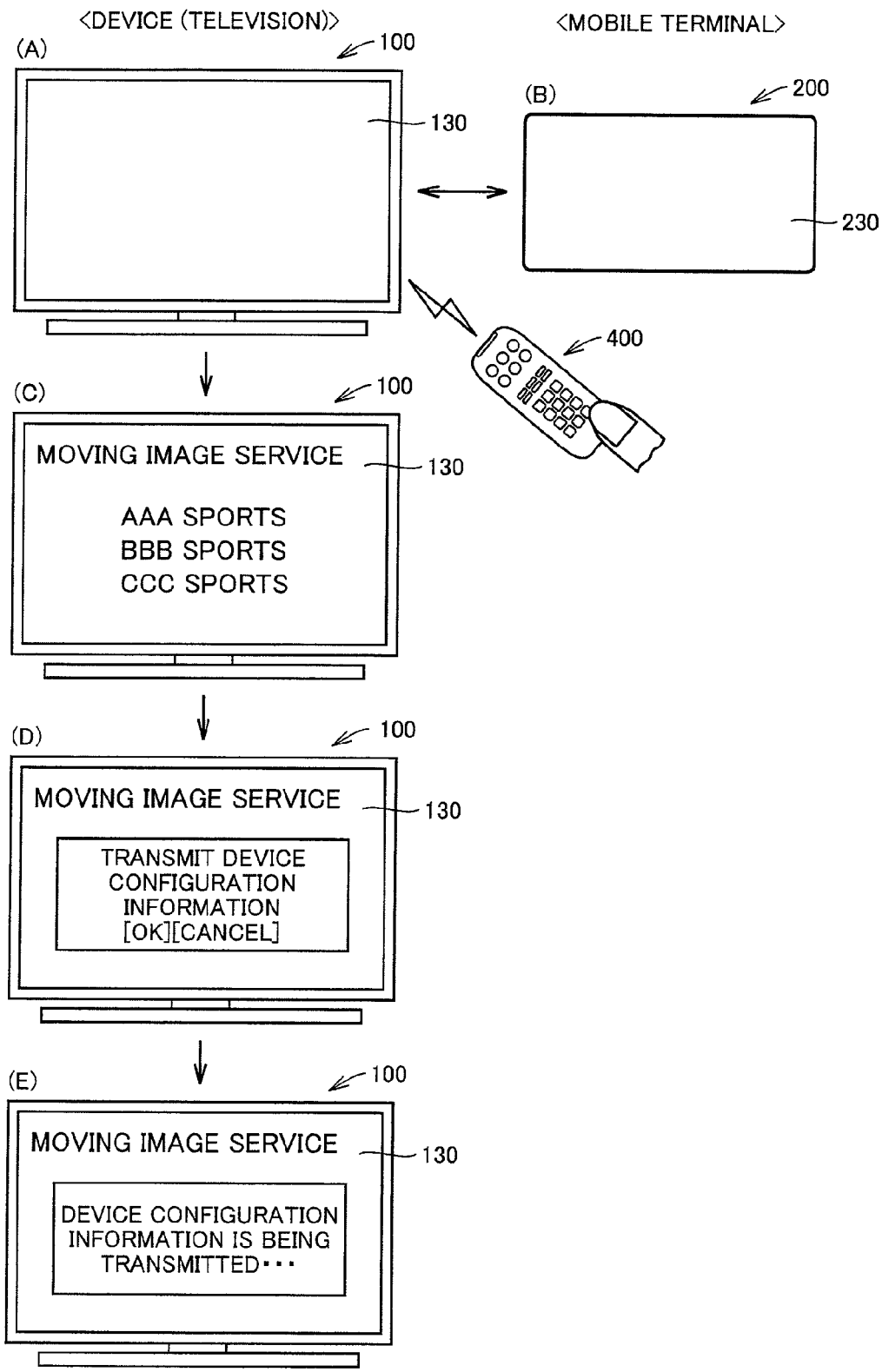
FIG. 13 is a first conceptual diagram showing screen transition of the liquid crystal television and the mobile phone according to the first embodiment.
Figure 14:
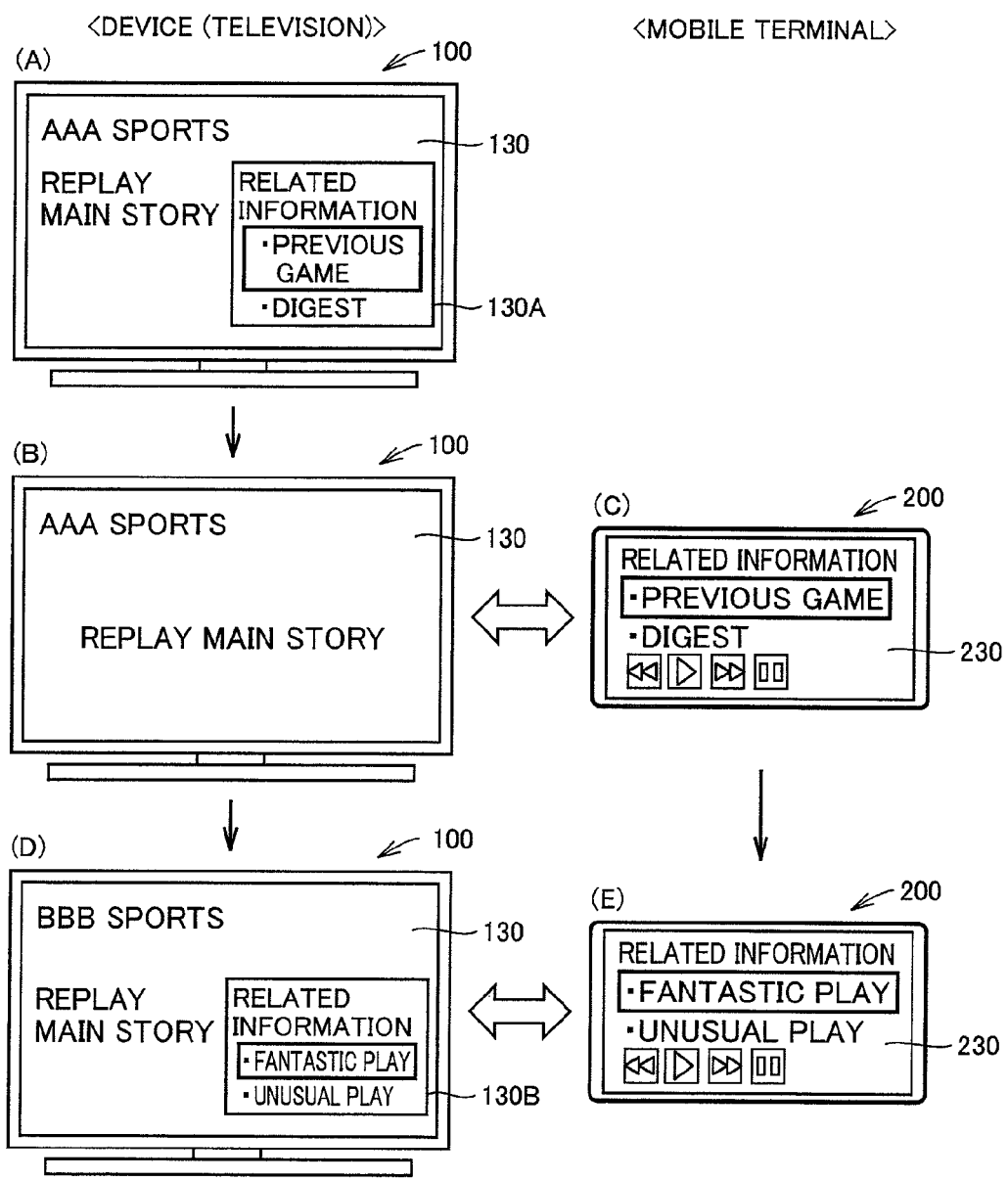
FIG. 14 is a second conceptual diagram showing screen transition of the liquid crystal television and the mobile phone according to the first embodiment.

Next, a process procedure of a control information reception/transmission process in network system 1 according to the present embodiment will be described with reference to FIGS. 2, 5, and 12 to 14. FIG. 12 is a sequence diagram showing the process procedure of the control information reception/transmission process in network system 1 according to the present embodiment. FIG. 13 is a first conceptual diagram showing screen transition of liquid crystal television 100 and mobile phone 200 according to the present embodiment. FIG. 14 is a second conceptual diagram showing screen transition of liquid crystal television 100 and mobile phone 200 according to the present embodiment.

First, as shown in FIG. 13(A), liquid crystal television 100 outputs a television broadcast on a channel desired by the user, in response to a command from remote controller 400. When mobile phone 200 is turned on or when mobile phone 200 enters a building in which liquid crystal television 100 is arranged, a connection process between liquid crystal television 100 and mobile phone 200 is performed. CPU 100 of liquid crystal television 100 connects to server 300 via communication unit 162 based on the command from remote controller 400 (step S202).

In other words, as shown in FIG. 13(C), liquid crystal television 100 connects to a site run by a service distributing moving images. CPU 110 of liquid crystal television 100 accepts a moving image selection command from the user, and transmits a moving image transmission request to server 300.

The user may input a site specifying command to liquid crystal television 100 via mobile phone 200. In other words, liquid crystal television 100 transmits device information A and B to server 300 at the site specified by mobile phone 200.

Server 300 requests the device information (device configuration information) (step S204). More specifically, similarly to the second embodiment, CPU 310 of server 300 may transmit a list of the functions included in function corresponding database 320A of server 300 itself to liquid crystal television 100 via communication unit 362.

Liquid crystal television 100 accepts the device information request (step S206). More specifically, at this time, CPU 110 of liquid crystal television 100 may display a confirmation screen as shown in FIG. 13(D). Then, CPU 110 of liquid crystal television 100 may accept input of an "OK" button from the user as a transmission command via input unit 140.

CPU 110 of liquid crystal television 100 transmits transmission data D1 to server 300 via communication unit 162 based on the latest device information list 120B (step S208). More specifically, at this time, CPU 110 of liquid crystal television 100 may cause display 130 to display a screen indicating during transmission as shown in FIG. 13(E).

Server 300 receives transmission data D1 from liquid crystal television 100 (step S210). By referring to function corresponding database 320A, CPU 310 of server 300 extracts the control information corresponding to the function of liquid crystal television 100 and the function of mobile phone 200 based on transmission data D1. CPU 310 of server 300 transmits this control information (transmission data D2) to liquid crystal television 100 via communication unit 362 (step S212).

Liquid crystal television 100 receives the control information from server 300 (step S214). More specifically, liquid crystal television 100 provides a user interface based on control information A included in transmission data D2 from server 300. More specifically, as shown in FIG. 14(A), CPU 110 of liquid crystal television 100 causes display 130 to display an image 130A for accepting selection of other moving images, based on control information A.

CPU 110 of liquid crystal television 100 accepts user operation via input unit 140 and remote control signal receiving unit 180 (step S216). The user may input an operation command to liquid crystal television 100 via remote controller 400, or may input the operation command to liquid crystal television 100 via mobile phone 200. CPU 110 of liquid crystal television 100 determines whether or not CPU 110 of liquid crystal television 100 has accepted, from the user, a command for transmitting the control information to an other device (step S218). Alternatively, CPU 110 determines whether or not control information B to be transmitted to an other device (mobile phone 200) is included in transmission data D2.

If CPU 110 of liquid crystal television 100 has accepted, from the user, the command for transmitting the control information to the other device or if control information B to be transmitted to mobile phone 200 is included in transmission data D2 (YES in step S218), CPU 110 generates transmission data D3 including control information B. CPU 110 transmits this transmission data D3 to mobile phone 200 via communication unit 160 (step S220).

More specifically, CPU 110 displays image 130A shown in FIG. 14(A), by using the PinP function. Thereafter, when CPU 110 of liquid crystal television 100 has accepted, from the user, the command for transmitting the control information to the other device or when control information B to be transmitted to mobile phone 200 is included in transmission data D2, CPU 110 transmits the control information (transmission data D3) to mobile phone 200. As a result, as shown in FIG. 14(B), image 130A on liquid crystal television 100 disappears.

Mobile phone 200 receives transmission data D3 (step S222). CPU 210 of mobile phone 200 provides a user interface based on control information B included in transmission data D3. In other words, as shown in FIG. 14(C), the above-mentioned image is displayed on mobile phone 200.

In addition, in the present embodiment, as shown in FIGS. 14(D) and (E), an application, a user interface, an image 130B and the like executed in liquid crystal television 100 and mobile phone 200 change depending on a content outputted by liquid crystal television 100 (provided by server 300), an operation and the like. In other words, the contents of transmission data D2 from server 300 and transmission data D3 from mobile phone 200 vary depending on a content outputted by liquid crystal television 100 (provided by server 300), an operation and the like. Here, the control information (transmission data D3) is transmitted from liquid crystal television 100 to mobile phone 200 based on the user operation. The control information may, however, be transmitted to mobile phone 200 automatically when liquid crystal television 100 receives the control information.

Second Embodiment

Next, a second embodiment of the present invention will be described. In network system 1 according to the above-mentioned first embodiment, server 300 transmits control information A and control information B to liquid crystal television 100. In other words, liquid crystal television 100 transmits (transfers) control information B to mobile phone 200. On the other hand, in network system 1 according to the present embodiment, server 300 transmits only control information A for liquid crystal television 100 to liquid crystal television 100, and transmits control information B for mobile phone 200 directly to mobile phone 200 without passing control information B through liquid crystal television 100.

Description of a configuration similar to that of network system 1 according to the first embodiment will not be repeated.

<Overall Configuration of Network System 1>

Figure 15:
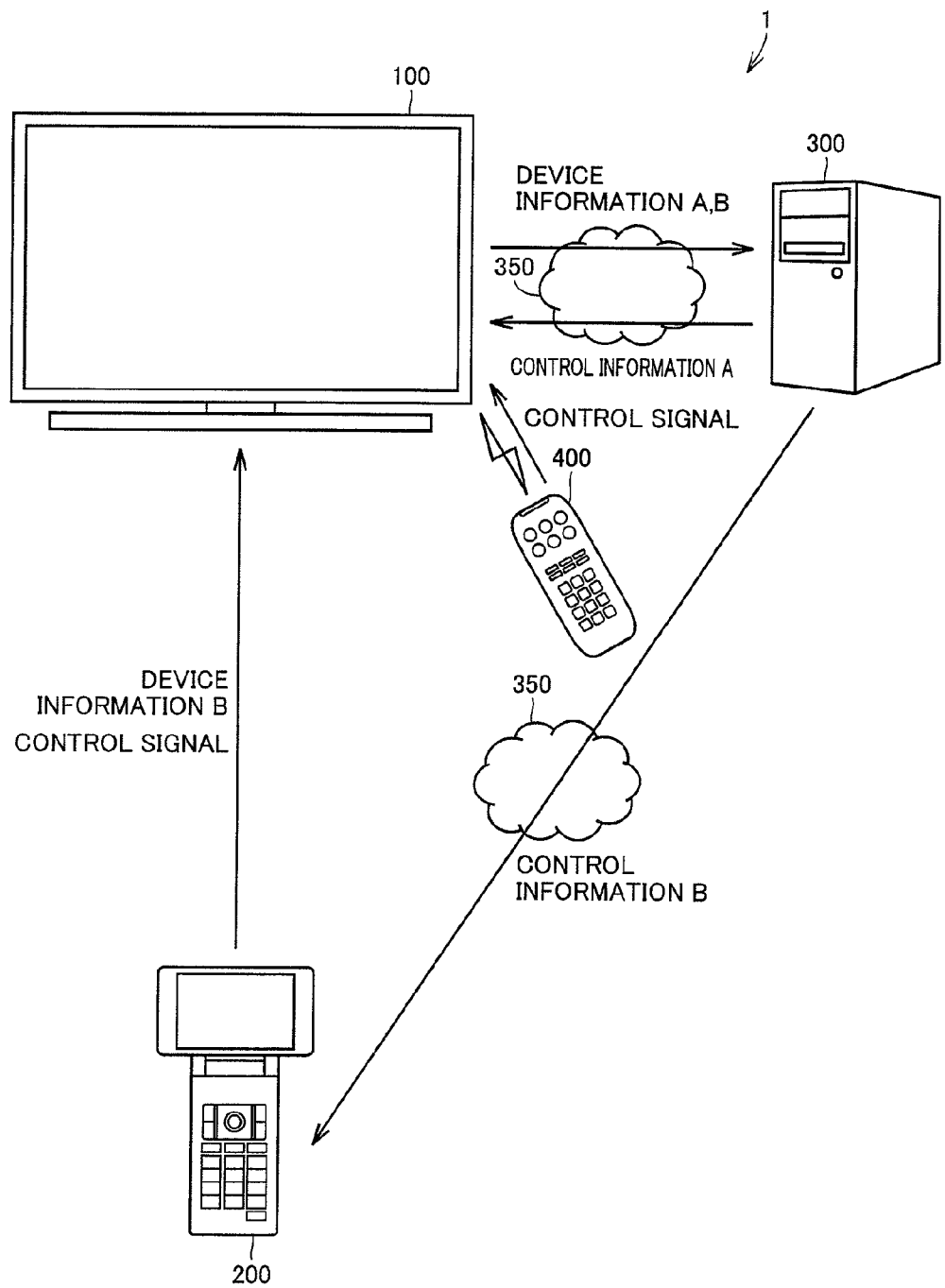
FIG. 15 is a conceptual diagram showing an overall configuration of a network system according to a second embodiment.

First, an overall configuration of network system 1 according to the present embodiment will be described with reference to FIG. 15. FIG. 15 is a conceptual diagram showing the overall configuration of network system 1 according to the present embodiment.

Network system 1 according to the present embodiment includes liquid crystal television (first device) 100, remote controller 400, mobile phone 200 (second device), and server 300. In addition to the above, network system 1 may include the electronic dictionary (third device), the air conditioner (fourth device), the lighting device (fifth device) and the like. Liquid crystal television 100, mobile phone 200, the electronic dictionary, the air conditioner, the lighting device and the like are connected via, for example, the home network.

Hardware configurations of liquid crystal television 100, remote controller 400, mobile phone 200, and server 300 are similar to those according to the first embodiment, and thus, description will not be repeated hereinafter.

<Overview of Operation of Network System 1>

Mobile phone 200 according to the present embodiment stores device information B indicating the function owned by mobile phone 200 itself. Mobile phone 200 transmits this device information B to liquid crystal television 100.

Liquid crystal television 100 stores device information A indicating the function owned by liquid crystal television 100 itself. When liquid crystal television 100 obtains a content such as moving image data from server 300, liquid crystal television 100 transmits device information A and device information B to server 300. It is to be noted that the information related to the functions owned by liquid crystal television 100 and mobile phone 200 may be information simply specifying the types of these devices. In this case, server 300 may only store a database in which the information specifying the device types and the functions owned by the devices are associated with each other.

Server 300 transmits the content itself and control information A corresponding to the content used in liquid crystal television 100 to liquid crystal television 100 via the network such as Internet 350. Control information A is a driver, an application program, HTML data, a UI part, contents data and the like executed in liquid crystal television 100. For example, based on control information A, liquid crystal television 100 can implement a user interface corresponding to a content that is being displayed.

Particularly, server 300 according to the present embodiment transmits control information B corresponding to a content used in mobile phone 200 to mobile phone 200 via the network such as Internet 350. Control information B is, for example, an application program executed in mobile phone 200. It is to be noted that the programs may be prestored in liquid crystal television 100 and mobile phone 200, and in this case, control information A and B may be pointers specifying these programs.

Based on control information B, mobile phone 200 can implement a user interface corresponding to a content that is being displayed. Based on control information B, mobile phone 200 provides a user interface for controlling liquid crystal television 100, the air conditioner and the lighting device.

As mentioned above, in network system 1 according to the present embodiment, the communication devices (liquid crystal television 100 and mobile phone 200) can obtain, from server 300, useful information suited to the connection situation, the type of the content and the like in the home network. In other words, server 300 can provide the useful information suited to the connection situation, the type of the content and the like in the home network to the communication devices (liquid crystal television 100 and mobile phone 200).

A configuration for implementing the above-mentioned functions will be described in detail hereinafter. As mentioned above, the hardware configurations of liquid crystal television 100, remote controller 400, mobile phone 200, and server 300 are similar to those according to the first embodiment, and thus, description will not be repeated.

<Reception and Transmission of Data>

An operation of receiving and transmitting data in network system 1 will be described hereinafter. First, referring to FIGS. 1 and 4, CPU 210 of mobile phone 200 connectable to liquid crystal television 100 transmits device data 220A to liquid crystal television 100 via communication unit 260 in response to a request from liquid crystal television 100. CPU 110 of liquid crystal television 100 receives device data 220A from mobile phone 200 via communication unit 160. CPU 110 of liquid crystal television 100 also receives device data from other connectable devices via communication unit 160.

Referring to FIG. 7, CPU 110 of liquid crystal television 100 causes storage unit 120 to store, as device information list 120B, device data 220A received from the connectable device. More specifically, CPU 110 stores the device ID, the terminal name, the user ID, the function information, and whether communication is possible or not, which have been received via communication unit 160, in association with one another for each connectable device.

CPU 110 according to the present embodiment determines, at predetermined timing, whether communication with each mobile phone 200 is possible or not. Based on a result of the determination, CPU 110 updates the section "communication is possible or not" in the device information list.

FIG. 16 is a conceptual diagram showing transmission data (device configuration information) D4 transmitted to server 300 by liquid crystal television 100 according to the present embodiment. Referring to FIG. 16, based on device information list 120B, CPU 110 of liquid crystal television 100 collectively transmits the function owned by liquid crystal television 100 and the functions owned by the devices that can carry out communication with liquid crystal television 100, to server 300 via communication unit 262.

In transmission data D4 in the present embodiment, the device ID for identifying the device that can carry out communication with liquid crystal television 100, the name of the device, the function, and the address of the device are associated with one another. More specifically, in the present embodiment, based on device information list 120B, CPU 110 of liquid crystal television 100 updates transmission data D4 as needed, which is a collection of the function owned by liquid crystal television 100 and the functions owned by the devices that can carry out communication with liquid crystal television 100.

In the present embodiment, server 300 can recognize which device has which function, based on transmission data D4. In other words, transmission data D4 include a correspondence relationship between the function and the device, and thus, server 300 can recognize which device has which function.

FIG. 17 is a conceptual diagram showing transmission data D5 transmitted to liquid crystal television 100 by server 300 according to the present embodiment. Referring to FIG. 17, by referring to function corresponding database 320A, CPU 310 of server 300 extracts a function included in function corresponding database 320A and control information corresponding to the function, of the functions of liquid crystal television 100 included in transmission data D4. In other words, CPU 310 of server 300 extracts the function of liquid crystal television 100 included in transmission data D4 and the control information corresponding to the function, of the functions included in function corresponding database 320A. CPU 310 of server 300 transmits this control information and this function to liquid crystal television 100 as transmission data D5 via communication unit 362.

CPU 110 of liquid crystal television 100 receives transmission data D5 from server 300. Based on control information A included in transmission data D5, liquid crystal television 100 can execute an application and the like related to a content that is being displayed on liquid crystal television 100.

FIG. 18 is a conceptual diagram showing transmission data D6 transmitted to mobile phone 200 by server 300. Referring to FIG. 18, by referring to function corresponding database 320A, CPU 310 of server 300 extracts a function included in function corresponding database 320A and control information corresponding to the function, of the functions of mobile phone 200 included in transmission data D4. In other words, CPU 310 of server 300 extracts the function of mobile phone 200 included in transmission data D4 and the control information corresponding to the function, of the functions included in function corresponding database 320A. CPU 310 of server 300 transmits this control information and this function to mobile phone 200 as transmission data D6 via communication unit 362.

Mobile phone 200 receives, from server 300, transmission data D6 that can be used by mobile phone 200 itself. Based on control information B included in transmission data D6, mobile phone 200 implements a user interface and the like for remotely controlling liquid crystal television 100, the air conditioner and the lighting device.

<Device Registration Process>

Figure 19:
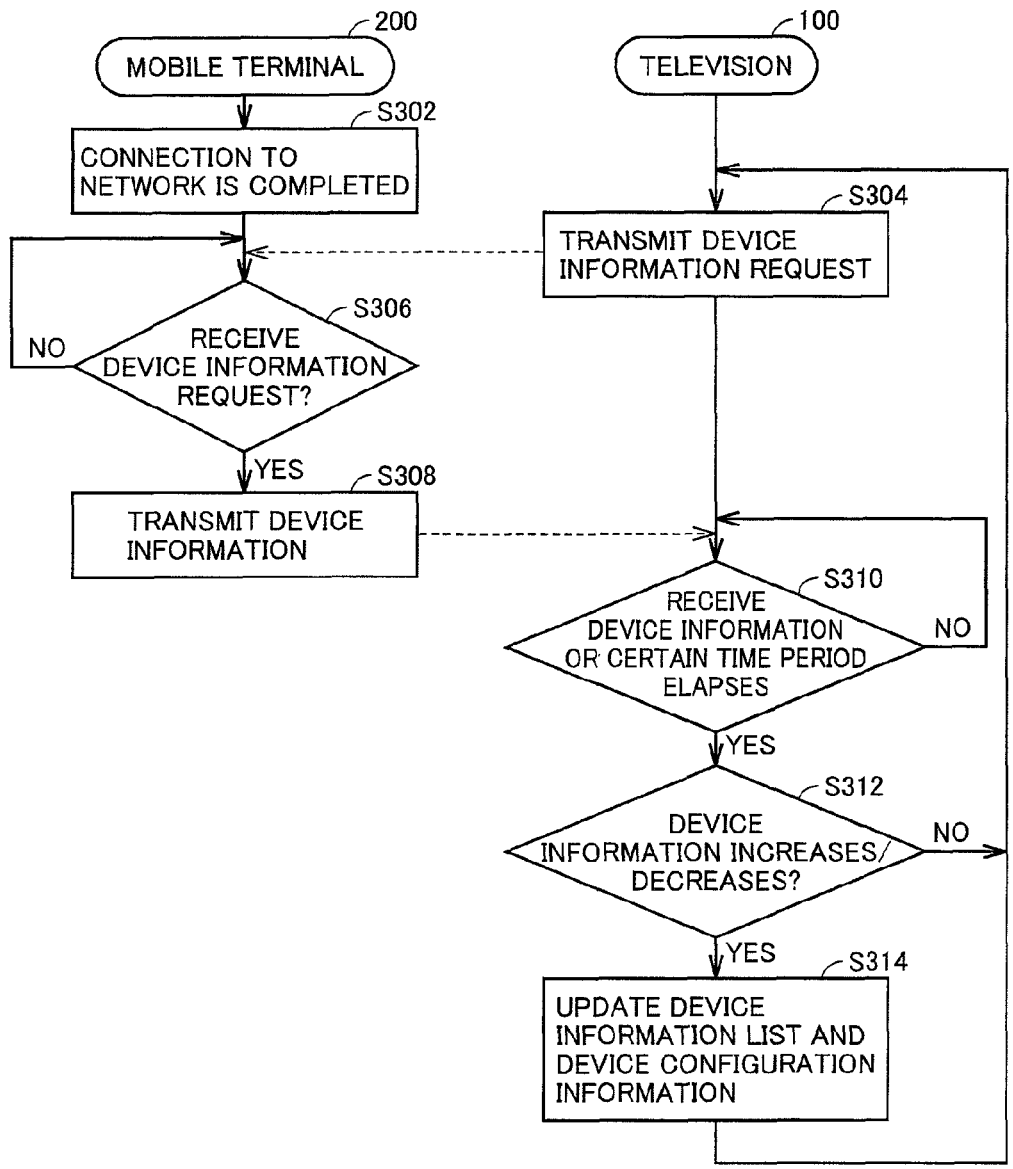
FIG. 19 is a sequence diagram showing a process procedure of a device registration process in network system 1 according to the second embodiment.

Next, a process procedure of a device registration process in network system 1 according to the present embodiment will be described with reference to FIGS. 2 and 19. FIG. 19 is a sequence diagram showing the process procedure of the device registration process in network system 1 according to the present embodiment.

The device registration process according to the present embodiment is basically similar to that according to the first embodiment. However, in step S314, CPU 110 of liquid crystal television 100 updates device information list (device information list) 120B and transmission data (device configuration information) D4.

<Control Information Reception/Transmission Process>

Figure 20:
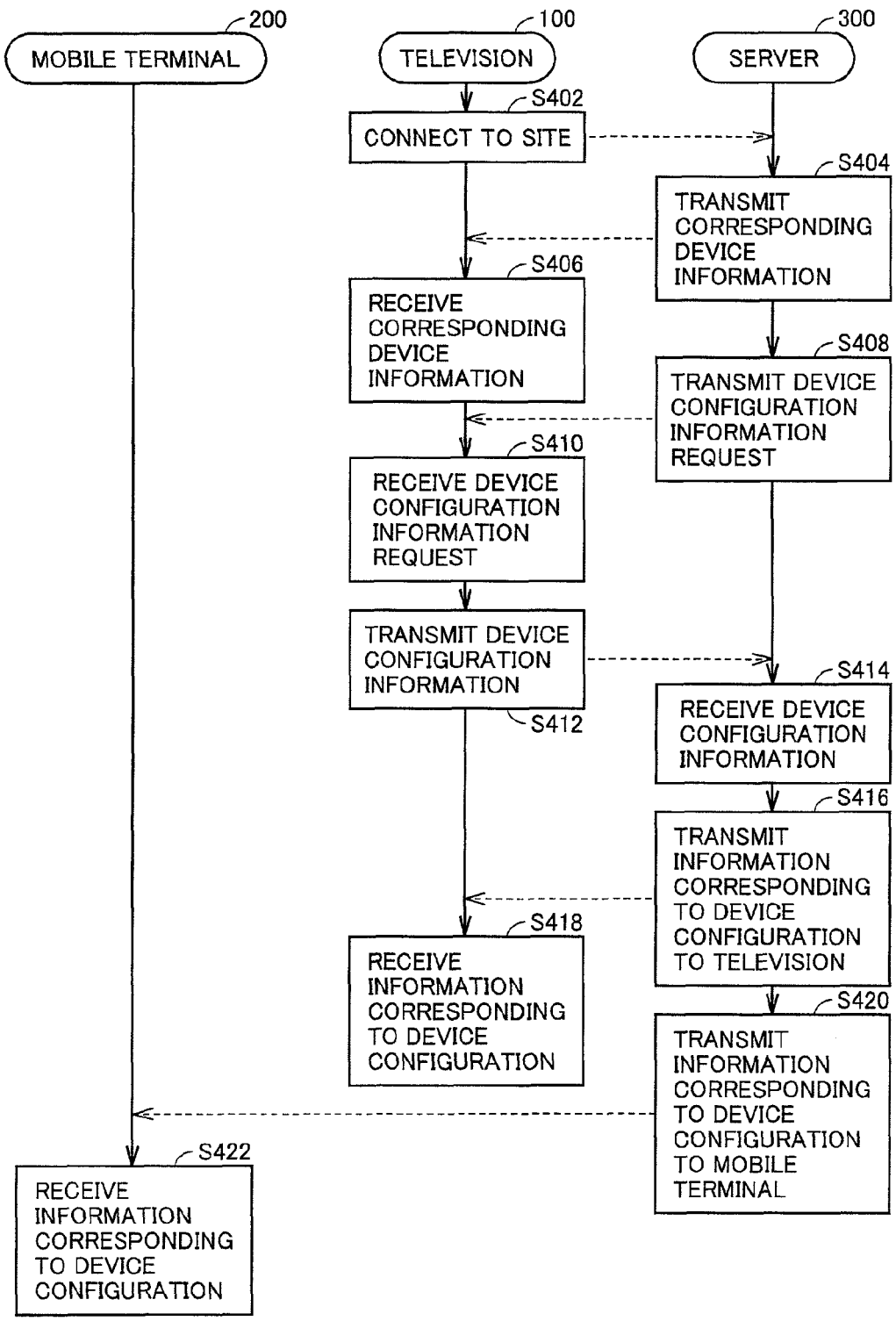
FIG. 20 is a sequence diagram showing a process procedure of a control information reception/transmission process in network system 1 according to the second embodiment.
Figure 21:
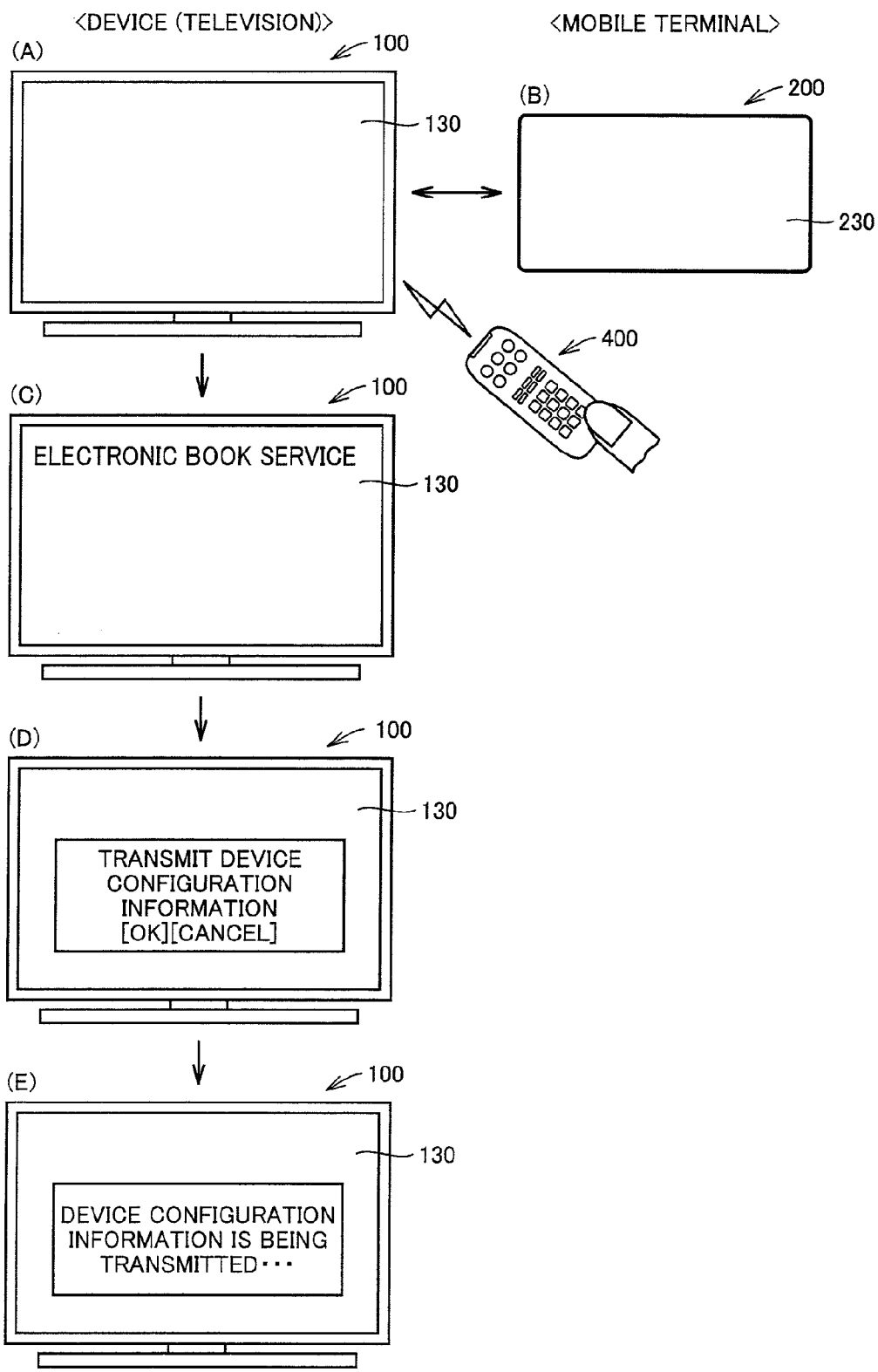
FIG. 21 is a first conceptual diagram showing screen transition of the liquid crystal television and the mobile phone according to the second embodiment.
Figure 22:
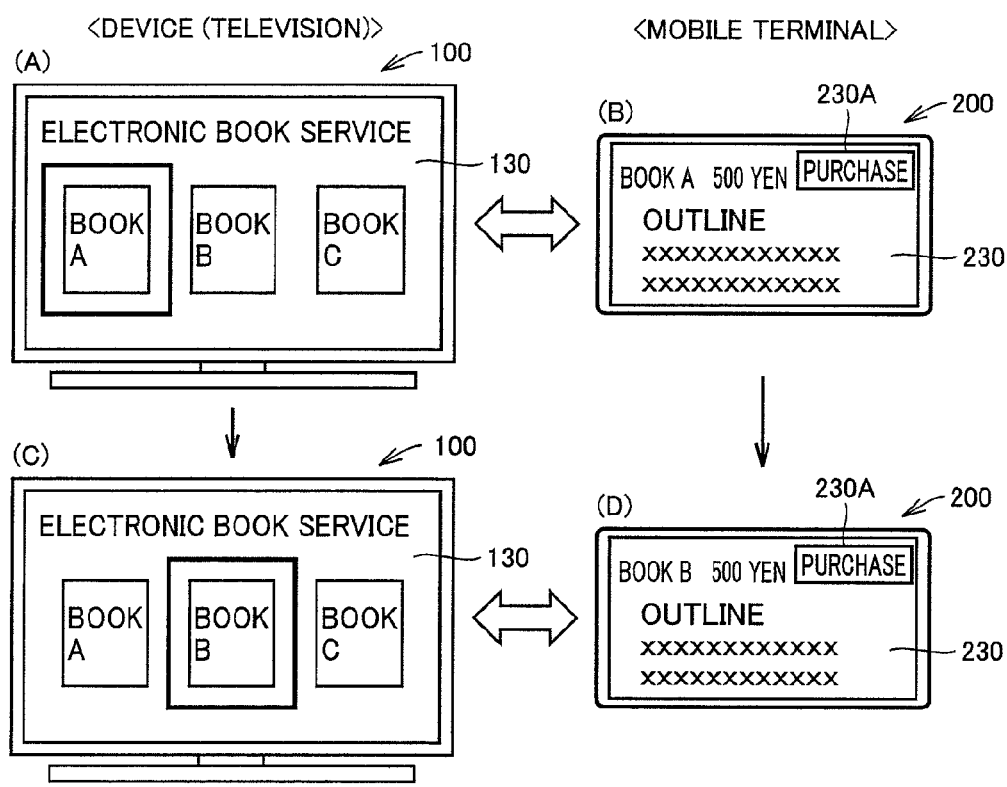
FIG. 22 is a second conceptual diagram showing screen transition of the liquid crystal television and the mobile phone according to the second embodiment.

Next, a process procedure of a control information reception/transmission process in network system 1 according to the present embodiment will be described with reference to FIGS. 2, 5, and 20 to 22. FIG. 20 is a sequence diagram showing the process procedure of the control information reception/transmission process in network system 1 according to the present embodiment. FIG. 21 is a first conceptual diagram showing screen transition of liquid crystal television 100 and mobile phone 200 according to the present embodiment. FIG. 22 is a second conceptual diagram showing screen transition of liquid crystal television 100 and mobile phone 200 according to the present embodiment.

First, as shown in FIG. 21(A), liquid crystal television 100 outputs a television broadcast on a channel desired by the user, in response to a command from remote controller 400. A connection process between liquid crystal television 100 and mobile phone 200 is performed. CPU 100 of liquid crystal television 100 connects to server 300 via communication unit 162 based on the command from remote controller 400 (step S402).

In other words, as shown in FIG. 21(C), liquid crystal television 100 connects to a site run by a service distributing electronic books. CPU 110 of liquid crystal television 100 accepts an electronic book selection command from the user, and transmits an electronic book transmission request to server 300.

By referring to function corresponding database 320A of server 300 itself, CPU 310 of server 300 transmits a list of the functions that can be dealt with to liquid crystal television 100 via communication unit 362 (step S404). Liquid crystal television 100 receives the list of the functions that can be dealt with by server 300 (step S406).

Server 300 requests the device information (device configuration information) (step S408). Liquid crystal television 100 accepts the device information request (step S410). More specifically, at this time, CPU 110 of liquid crystal television 100 may display a confirmation screen as shown in FIG. 21(D). Then, CPU 110 of liquid crystal television 100 may accept input of an "OK" button from the user as a transmission command via input unit 140.

CPU 110 of liquid crystal television 100 transmits transmission data D4 to server 300 via communication unit 162 based on the latest device information list 120B (step S412). More specifically, CPU 110 extracts, from device information list 120B, a function included in the list of the functions that can be dealt with by server 300. CPU 110 transmits only the device information including the extracted function to server 300 via communication unit 162. CPU 110 of liquid crystal television 100 may cause display 130 to display a screen indicating during transmission as shown in FIG. 21(E).

Server 300 receives transmission data D4 from liquid crystal television 100 (step S414). By referring to function corresponding database 320A, CPU 310 of server 300 extracts control information A corresponding to the function of liquid crystal television 100 based on transmission data D4. CPU 310 of server 300 transmits this control information (transmission data D5) to liquid crystal television 100 via communication unit 362 (step S416).

Liquid crystal television 100 receives control information A from server 300 (step S418). More specifically, liquid crystal television 100 provides a user interface based on control information A included in transmission data D5 from server 300. More specifically, as shown in FIG. 22(A), CPU 110 of liquid crystal television 100 causes display 130 to display an image for accepting selection of other electronic books, based on control information A.

By referring to function corresponding database 320A, CPU 310 of server 300 extracts control information B corresponding to the function of mobile phone 200, based on transmission data D4. CPU 310 of server 300 transmits this control information (transmission data D6) to mobile phone 200 via communication unit 362 (step S420).

Mobile phone 200 receives transmission data D6 (step S422). CPU 210 of mobile phone 200 provides a user interface based on control information B included in transmission data D6. In other words, as shown in FIG. 22(B), a text, an image (a purchase button 230A) and the like indicating explanation of a book selected on liquid crystal television 100 are displayed on mobile phone 200 based on control information B.

In addition, in the present embodiment, as shown in FIGS. 22(C) and (D), the contents displayed on mobile phone 200 change depending on the electronic book selected on liquid crystal television 100. Transmission data D5 and D6 from server 300 may vary depending on a content outputted by liquid crystal television 100 (provided by server 300) and an operation of selecting the electronic book. As a result, an application, a user interface, an image and the like executed in liquid crystal television 100 and mobile phone 200 may vary depending on a content outputted by liquid crystal television 100 (provided by server 300) and the operation of selecting the electronic book.

Other Embodiments

In the first and second embodiments, liquid crystal television 100 transmits device information A of liquid crystal television 100 and device information B of mobile phone 200 to server 300. However, mobile phone 200 may transmit device information A of liquid crystal television 100 and device information B of mobile phone 200 to server 300, using communication unit 262 or 266. Then, mobile phone 200 may receive device information A and B from server 300 and transmit (transfer) this device information A to liquid crystal television 100. Alternatively, mobile phone 200 may receive device information B from server 300 and liquid crystal television 100 may receive device information A from server 300.

It is also considered that each of liquid crystal television 100 and mobile phone 200 receives and transmits its own device information, and liquid crystal television 100 and mobile phone 200 transmit device information A and device information B to server 300, respectively. In this case, server 300 may be divided into a server for communication with liquid crystal television 100 and a server for communication with mobile phone 200, and each of liquid crystal television 100 and mobile phone 200 obtains the control information corresponding to the device itself.

It should be immediately apparent that the present invention is also applicable to the case where a program is provided to a system or apparatus to achieve the present invention. A storage medium storing a program represented by software for achieving the present invention may be provided to a system or apparatus and a computer (or CPU or MPU) of the system or apparatus may read and execute a program code stored by the storage medium, which can also provide the effects of the present invention.

In this case, the program code itself read from the storage medium implements the functions of the embodiments as mentioned above, and accordingly, the storage medium storing the program code constitutes the present invention.

As the storage medium for providing the program code, hard disc, optical disc, magneto-optical disc, CD-ROM, CD-R, magnetic tape, non-volatile memory card (IC memory card), ROM (mask ROM, flash EEPROM or the like), or the like can be used, for example.

The functions of the embodiments as mentioned above may also be implemented, not only by execution of the program code read by the computer, but also by actual processing partially or entirely executed by an OS (Operating System) operating on the computer based on instructions of the program code, which should also be immediately apparent.

Furthermore, the program code read from the storage medium may be written to a memory of a feature expansion board inserted to a computer or a feature expansion unit connected to a computer, and thereafter, a CPU or the like of the feature expansion board or feature expansion unit may perform a part or the whole of the actual processing based on instructions of the program code, so that the processing implements the functions of the embodiments as mentioned above, which should also be immediately apparent.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST 1 network system; 50 communication unit; 100 liquid crystal television; 102 antenna; 105 tuner; 107 data processing unit; 120 storage unit; 120A device data; 120B device information list; 122 temporary storage unit; 130 display; 130A image; 130B image; 140 input unit; 160 communication unit; 162 communication unit; 170 sound output unit; 180 remote controller signal receiving unit (remote control signal receiving unit); 200 mobile phone; 220 storage unit; 220A device data; 220B device data; 222 temporary storage unit; 230 touch panel; 230A purchase button; 238 biological information reading unit; 240 input unit; 255 recording medium; 256 recording medium access unit; 260 communication unit; 262 communication unit; 264 antenna; 266 communication unit; 270 sound output unit; 274 sound input unit; 278 image capturing unit; 279 vibration unit; 300 content providing server; 320 storage unit; 320A function corresponding database; 322 temporary storage unit; 330 display; 340 input unit; 342 mouse; 344 keyboard; 350 Internet; 360 communication unit; 362 communication unit; 400 remote controller

The invention claimed is:

1. A network system comprising a first device, a plurality of second devices, and a server,
said first device including:
a first storage unit configured to store first device information indicating at least one of a function of said first device and a type of said first device; and a first communication unit configured to receive, from a plurality of said second devices that are arranged nearby the first device, second device information indicating at least one of a function of said second device and a type of said second device, to transmit said second device information received from the plurality of second devices that are arranged nearby the first device and first device information to said server, and to receive first control information used by said first device from said server,
said second device including:
a second storage unit configured to store said second device information; and
a second communication unit configured to transmit said second device information to said first device, and to receive second control information used by said second device from said server,
said server including:
a server storage unit configured to store a plurality of functions, each of said plurality of functions being associated with said control information for using the function;
a control unit configured to extract said first control information for implementing a user interface via which said first device accepts a command from a user and second control information for remotely controlling said first device based on said first and second device information, by referring to said server storage unit; and
a server communication unit configured to transmit said first control information to said first device, and to transmit said second control information to each of said second devices that are arranged near the first device,
wherein said server storage unit stores the information indicating the function, the first control information, and the second control information, and
wherein said control unit is configured
to extract said first device information and said first control information being associated with the content transmitted from said server to said first device to display the content based on the control information associated with the content, and
to extract said second device information and said second control information being associated with the content transmitted from said server to said second device to display the content based on the control information associated with the content.

2. The network system according to claim 1, wherein said server communication unit is configured to transmit said second control information to said second device via said first device.

3. The network system according to claim 2, wherein said first communication unit is configured to transmit said first and second device information to said server in such a manner that it cannot be determined whether said first device or said second device has each of said functions.

4. The network system according to claim 1, wherein said server communication unit is configured to transmit said second control information to said second device without passing said second control information through said first device.

5. The network system according to claim 1, wherein said first communication unit includes:
a first communication interface configured to receive said second device information from said second device; and a second communication interface configured to transmit said first and second device information to said server, and to receive said first control information from said server.

6. The network system according to claim 1, wherein
said server communication unit is configured to transmit the functions stored in said server storage unit to said first device, and
said first communication unit is configured to transmit, to said server, only a portion of said first device information corresponding to the functions stored in said server storage unit.

7. The network system according to claim 1, wherein
said server storage unit is configured to store a content in association with said function and said control information,
said server communication unit is configured to transmit said content to said first device,
said control unit is configured to extract said first and second control information based on said first and second device information and said content, by referring to said server storage unit, and
said first device is configured further to include a display for displaying said content.

8. The network system according to claim 1, wherein
said first device further includes a display configured to output a content, and
said server is configured to provide said first device with said content to be outputted by said first device.

9. A communication method in a network system including a first device, and a plurality of second devices, and a server, the communication method comprising the steps of:
storing, by said server, a plurality of functions in a storage unit, each of said plurality of functions being associated with control information for using the function;
storing, by said first device, first device information indicating at least one of a function of said first device and a type of said first device;
respectively storing, by said second devices, second device information indicating at least one of a function of said second devices and types of said second devices;
transmitting, by said second devices, said second device information to said first device;
receiving, by said first device, from a plurality of said second devices that are arranged nearby the first device, second device information indicating at least one of a function of said second device and a type of said second device,
transmitting, by said first device, said second device information received from the plurality of second devices that are arranged nearby the first device and first device information to said server;
extracting, by said server, said first control information used by said first device for implementing a user interface via which said first device accepts a command from a user and said second control information used by said second device for remotely controlling said first device based on said first and second device information, by referring to said storage unit;
transmitting, by said server, said first control information to said first device;
transmitting, by said server, said second control information to each of said second devices;
storing, by the storage unit, the information indicating the function, the first control information, and the second control information, and
extracting, by said server, said first device information and said first control information being associated with the contents transmitted from said server to said first device to display the content based on the control information associated with the content, and
extracting, by said server, said second device information and said second control information being associated with the contents transmitted from said server to said second device to display the content based on the control information associated with the content.

10. The communication method according to claim 9, wherein
the step of transmitting said second control information includes a step of transmitting said second control information to said second device via said first device.

11. A communication device connectable to a server and other communication devices, comprising:
a storage unit is configured to store first device information indicating at least one of a function of said communication devices and a type of said communication devices; and
a communication unit is configured to receive second device information from a plurality of second devices that are arranged nearby the first device, indicating at least one of a function of said other communication devices and a type of said other communication devices from said other communication device, to transmit said second device information received from the plurality of second devices that are arranged nearby the first device and first device information to said server for said other communication devices to remotely control said communication devices, and to receive first control information used by said communication devices for implementing a respective user interface via which said communication device accepts a command from a user from said server wherein
a server storage unit stores the information indicating the function, the first control information, and the second control information, and
wherein a control unit of said server is configured to
extract said first device information and said first control information being associated with the contents transmitted from said server to said first device to display the content based on the control information associated with the content, and
extract said second device information and said second control information being associated with the contents transmitted from said server to said second device to display the content based on the control information associated with the content.

12. A communication method in a communication device including a processor, a storage unit and a communication unit, the communication method comprising the steps of:
storing, by the storage unit, first device information indicating at least one of a function of said communication device and a type of said communication device;
receiving, by said processor, from a plurality of second devices that are arranged nearby said first device second device information indicating at least one of a function of the second devices and types of said second devices from said other communication device via said communication unit;
transmitting, by said processor, said second device information received from the plurality of second devices that are arranged nearby the first device and first device information to a server via said communication unit for said other communication device to remotely control said communication device;

receiving, by said processor, first control information used by said communication device from said server via said communication unit for implementing a user interface via which said communication device accepts a command from a user;

transmitting, by said server, said second control information to each of said second devices that are arranged near the first device;

storing, by the storage unit, the information indicating the function, the first control information, and the second control information, and extracting, by said server, said first device information and said first control information being associated with the contents transmitted from said server to said first device to display the content based on the control information associated with the content, and extracting, by said server, said second device information and said second control information being associated with the contents transmitted from said server to said second device to display the content based on the control information associated with the content.

13. A non-transitory computer-readable recording medium on which a communication program for causing a communication device including a processor and a communication unit to carry out communication, said communication program causing said processor to execute the steps of:

storing first device information indicating at least one of a function of said communication device and a type of said communication device in a storage unit;

receiving second device information from a plurality of second devices that are arranged nearby said first device indicating at least one of a function of an other communication device and a type of said other communication device for each of said plurality of second devices from said other communication device via said communication unit;

transmitting said second device information received from the plurality of second devices that are arranged nearby the first device and first device information to a server via said communication unit for said other communication device to remotely control said communication device;

receiving first control information used by said communication device from said server via said communication unit for implementing a user interface via which said communication device accepts a command from a user;

transmitting, by said server, said second control information to each of said second devices that are arranged near the first device;

storing, by the storage unit, the information indicating the function, the first control information, and the second control information, and extracting, by said server, said first device information and said first control information being associated with the contents transmitted from said server to said first device to display the content based on the control information associated with the content, and extracting, by said server, said second device information and said second control information being associated with the contents transmitted from said server to said second device to display the content based on the control information associated with the content.

14. A network system comprising first and second devices and a server, said first device including:
  a first storage unit configured to store first device information indicating at least one of a function of said first device and a type of said first device; and
  a first communication unit configured to transmit said first device information to said second device, to receive second device information indicating at least one of a function of each of said second devices and a type of said second devices from a plurality of said second devices located near said first device, to transmit said second device information received from the plurality of second devices that are arranged nearby the first device and first device information to said server, and to receive first control information used by said first device for implementing a user interface via which said first device accepts a command from a user from said server, said second device including:
  a second storage unit configured to store said second device information; and
  a second communication unit configured to receive said first device information from said first device, to transmit said second device information to said first device, to transmit said first and second device information to said server, and to receive second control information used by said second device for remotely controlling said first device by said second device from said server, said server including:
  a server storage unit configured to store a plurality of functions, each of said plurality of functions being associated with said control information for using the function;
  a control unit configured to extract said first and second control information based on said first and second device information, by referring to said server storage unit;
  a server communication unit configured to transmit said first control information to said first device, and to transmit said second control information to each of said second devices that are arranged near said first device;

wherein said server storage unit stores the information indicating the function, the first control information, and the second control information, and wherein said control unit is configured
  to extract said first device information and said first control information being associated with the content transmitted from said server to said first device to display the content based on the control information associated with the content, and
  to extract said second device information and said second control information being associated with the content transmitted from said server to said second device to display the content based on the control information associated with the content.

* * * * *